United States Patent
Hasegawa

(10) Patent No.: US 11,164,370 B2
(45) Date of Patent: Nov. 2, 2021

(54) INFORMATION PROCESSING APPARATUS AND ACCUMULATED IMAGES SELECTING METHOD

(71) Applicant: FUJITSU LIMITED, Kawasaki (JP)

(72) Inventor: Eiji Hasegawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/812,439

(22) Filed: Mar. 9, 2020

(65) Prior Publication Data
US 2020/0294308 A1    Sep. 17, 2020

(30) Foreign Application Priority Data

Mar. 15, 2019   (JP) .............................. JP2019-048934

(51) Int. Cl.
*G06T 17/05* (2011.01)
*G06T 7/62* (2017.01)
(Continued)

(52) U.S. Cl.
CPC .............. *G06T 17/05* (2013.01); *G06T 7/001* (2013.01); *G06T 7/11* (2017.01); *G06T 7/62* (2017.01); *G06T 2207/30184* (2013.01)

(58) Field of Classification Search
CPC .................................................... G06T 17/05
See application file for complete search history.

(56) References Cited

U.S. PATENT DOCUMENTS 6,542,767 B1 *   4/2003   McNichols .......... A61B 5/0008
                                                        600/407
2013/0016892 A1   1/2013   Grunkin et al.
(Continued)

FOREIGN PATENT DOCUMENTS

JP    2010-091410 A    4/2010
JP    2010-511213 A    4/2010
(Continued)

OTHER PUBLICATIONS

Extended European Search Report dated Jul. 15, 2020, for corresponding to European Patent Application No. 20159773.9, 9 pages.
(Continued)

*Primary Examiner* — Phi Hoang
(74) *Attorney, Agent, or Firm* — Fujitsu Patent Center

(57) ABSTRACT

An information processing apparatus includes: a memory; and a processor configured to: store data of images captured of a structure at positions changed relative to the structure and data of a three-dimensional model indicating a three-dimensional shape of the structure; select an image containing the largest image of a damaged portion in the structure as a first accumulated image in each of which the damaged portion is imaged among the images; and perform a selection process of selecting second accumulated images except the first accumulated image such that regarding an imaging range that is not covered by the first accumulated image in the three-dimensional model, an imaging range which overlaps between the second accumulated images is reduced, and a coverage ratio of the imaging range in the three-dimensional model with the selected second accumulated images and the first accumulated image is equal to or more than a predetermined value.

6 Claims, 17 Drawing Sheets

(51) Int. Cl.
*G06T 7/11* (2017.01)
*G06T 7/00* (2017.01)

(56) References Cited

U.S. PATENT DOCUMENTS

| | | | | |
|---|---|---|---|---|
| 2014/0375633 | A1* | 12/2014 | Dillard | G06T 17/20 |
| | | | | 345/420 |
| 2017/0322119 | A1* | 11/2017 | Da Silva | G01M 13/00 |
| 2018/0053347 | A1 | 2/2018 | Fathi et al. | |
| 2018/0082413 | A1* | 3/2018 | Saito | G06T 7/001 |
| 2019/0073641 | A1* | 3/2019 | Utke | G06Q 10/20 |
| 2019/0304026 | A1* | 10/2019 | Lyman | G06Q 50/165 |

FOREIGN PATENT DOCUMENTS

| | | |
|---|---|---|
| JP | 2016-142662 A | 8/2016 |
| WO | 2008/080403 A1 | 7/2008 |
| WO | 2012/132273 A1 | 10/2012 |

OTHER PUBLICATIONS

Adhikari, R. S. et al.,"Image-based retrieval of concrete crack properties bridge inspection", Automation in Construction, vol. 39, Apr. 1, 2014, pp. 180-194, XP055308376.

Yujie, Wei et al.,"3D Imaging in Construction and Infrastructure Management: Technological Assessment and Future Research Directions", May 19, 2018, Pervasive: International Conference on Pervasive Computing; [Lecture Notes in Computer Science; Lect. Notes Computer], Springer, Berlin, Heidelberg, pp. 37-60, XP047474632.

Shakeri, Reza et al.,"Design Challenges of Multi-UAV Systems in Cyber-Physical Applications: A Comprehensive Survey, and Future Directions", arxiv.org, Cornell University Library, 201 Olin Library Cornell University Ithaca, NY 14853, Oct. 23, 2018, pp. 1-44, XP081417582.

Tomohiro Shimizu et al.,"Development of Bridge Management System Using Three-Dimensional Model", Journal of Japan Society of Civil Engineers F3 (Information Science of Civil Engineering), vol. 69, No. 2, pp. I_45 to I_53, Oct. 4, 2013 (Total 16 pages).

* cited by examiner

INFORMATION PROCESSING APPARATUS AND ACCUMULATED IMAGES SELECTING METHOD

CROSS-REFERENCE TO RELATED APPLICATION

This application is based upon and claims the benefit of priority of the prior Japanese Patent Application No. 201948934, filed on Mar. 15, 2019, the entire contents of which are incorporated herein by reference.

FIELD

The embodiments discussed herein are related to an information processing apparatus and an accumulated images selecting method.

BACKGROUND

In recent years, in order to maintain and manage structures such as buildings and roads, an image obtained by capturing a structure or a three-dimensional (3D) model of a structure has been utilized.

Related techniques are disclosed in, for example, Japanese Laid-open Patent Publication No 2016-142662.

Related techniques are also disclosed in, for example, Shimizu Tomohiro and 7 others, "Development of Bridge Management System using Three-Dimensional Model", Journal of Japan Society of Civil Engineers F3 (Information Science of Civil Engineering), Vol. 69, No. 2, pp. I_45 to I_53 Oct. 4, 2013.

SUMMARY

According to an aspect of the embodiments, an information processing apparatus includes: a memory; and a processor coupled to the memory and configured to: store data of a plurality of images captured of a structure at positions changed relative to the structure and data of a three-dimensional model indicating a three-dimensional shape of the structure; select an image containing the largest image of a damaged portion in the structure as a first accumulated image to be accumulated from images in each of which the damaged portion is imaged among the plurality of images; and perform a selection process of selecting two or more second accumulated images to be accumulated from among the plurality of images except the first accumulated image such that regarding an imaging range that is not covered by the first accumulated image in the three-dimensional model, an imaging range which overlaps between a plurality of the second accumulated images is reduced, and a coverage ratio of the imaging range in the three-dimensional model with the selected two or more second accumulated images and the first accumulated image is equal to or more than a predetermined value.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

For example, in a system for maintaining and managing a bridge, it has been proposed to capture images of a deformation or repaired portion and to trace the corresponding portion in the captured images to reflect the position and shape of that portion in a 3D model. In a system for managing a road structure, it has been proposed to use point cloud data acquired by using a laser scanner while traveling on a road and image data acquired simultaneously with the point cloud data and associated with information on the position and angle at the time of capturing.

When the entire structure is imaged exhaustively for inspection of the structure, there is the following problem in accumulating a large amount of images thus obtained. It is important to keep an image in which a damaged portion is clearly visible among these images. On the other hand, if an image having a portion other than the damaged portion is discarded, it becomes impossible to verify whether the portion was actually not damaged later. However, if a large number of images are accumulated so that the entire structure is included in the imaging range in order to enable post-verification, there is a problem that the amount of data to be accumulated becomes enormous.

In one aspect, an information processing apparatus and an accumulated images selecting method capable of reducing the amount of accumulated data of an image in which a damaged portion is easily checked and an image in which the entire structure is visible may be provided.

Embodiments will be described below with reference to the accompanying drawings.

First Embodiment

Figure 1:
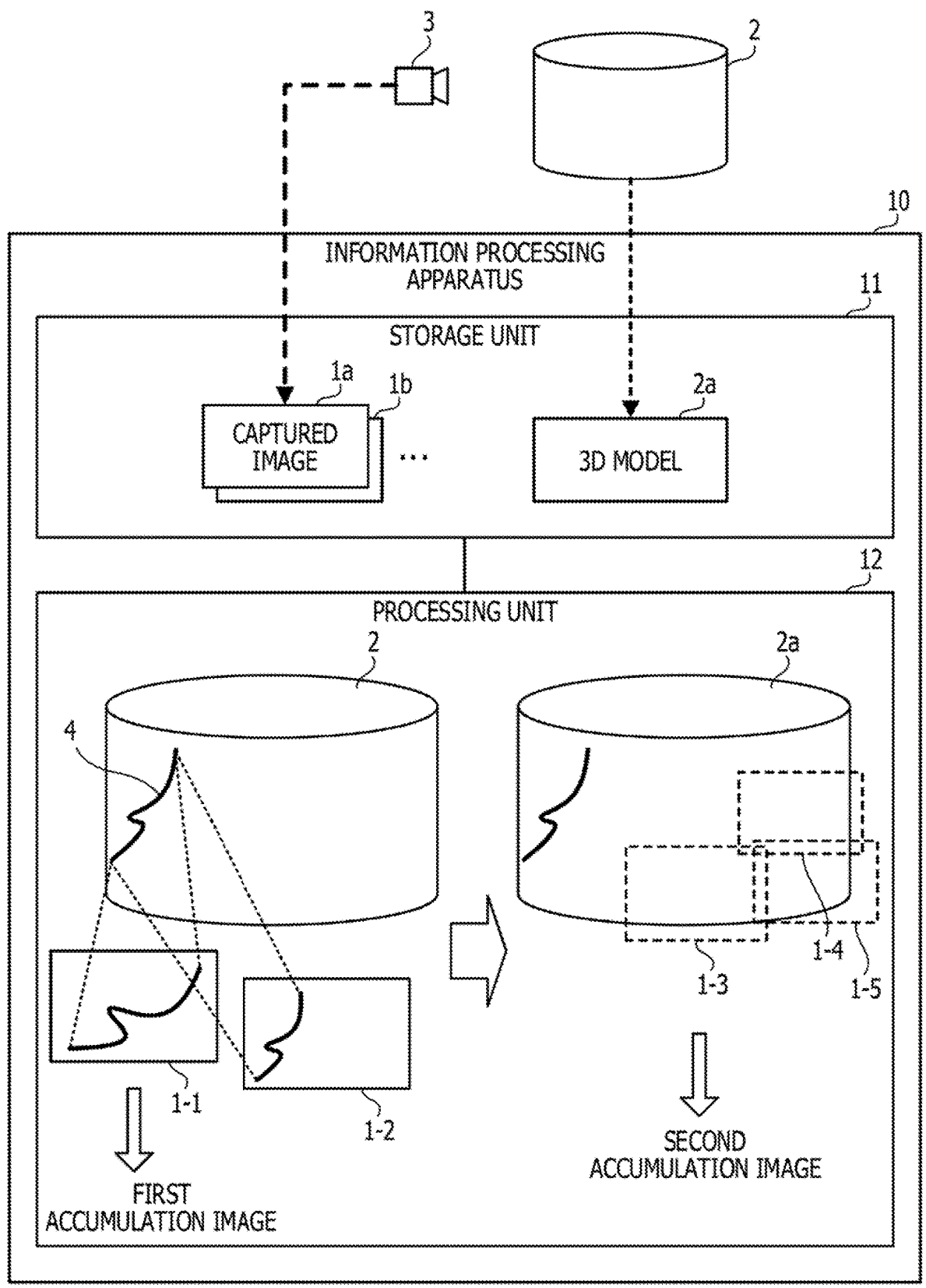
FIG. 1 is a diagram illustrating a configuration example and a processing example of an information processing apparatus according to a first embodiment.

FIG. 1 is a diagram illustrating a configuration example and a processing example of an information processing apparatus according to a first embodiment. The information processing apparatus 10 illustrated in FIG. 1 includes a storage unit 11 and a processing unit 12. The storage unit 11 is implemented, for example, as a storage device (not illustrated) included in the information processing apparatus 10. The processing unit 12 is implemented, for example, as a processor (not illustrated) included in the information processing apparatus 10.

The storage unit 11 stores data of images 1a, 1b, . . . , and a three-dimensional (3D) model 2a. The data of the images 1a, 1b, . . . are acquired by imaging a structure 2 by a camera 3 while changing the position relative to the structure 2. The data of the 3D model 2a is data indicating the 3D shape of the structure 2. The data of the 3D model 2a may be generated by the structure from motion (SfM) based on the data of the images 1a, 1b, . . . , for example.

The processing unit 12 selects an image containing the largest image of a damaged portion 4 in the structure 2, as a first accumulated image to be accumulated, from images in which the damaged portion 4 is imaged among the images 1a, 1b, . . . . In the example illustrated in FIG. 1, it is assumed that images 1-1, 1-2 in which the damaged portion 4 is imaged are extracted from among the images 1a, 1b, . . . . Since the damaged portion 4 is imaged more largely in the image 1-1 than in the image 1-2, the image 1-1 is selected as the first accumulated image.

The processing unit 12 executes a selection process to select 2 or more second accumulated images to be accumulated from among the images excluding the first accumulated image (image 1-1) out of the images 1a, 1b, . . . . In this selection process, the processing unit 12 selects a second accumulated image such that regarding an imaging range that is not covered by the first accumulated image in the 3D model 2a, an imaging range overlapping between second accumulated images is reduced, and a coverage ratio of the imaging range in the 3D model 2a with the selected second accumulated image and the first accumulated image is equal to or more than a predetermined value. This allows the second accumulated image to be selected such that the coverage ratio of the imaging range in the 3D model 2a is equal to or more than the predetermined value with the first accumulated image and a small number of second accumulated images. FIG. 1 illustrates an example in which images 1-3 to 1-5 are selected as examples of the second accumulated image. The images 1-3 to 1-5 are some of the second accumulated images selected.

According to the information processing apparatus 10 described above, it is possible to reduce the amount of accumulated data of an image in which the damaged portion 4 is easily checked and an image in which the entire structure 2 is imaged. For example, since the image containing the largest image of the damaged portion 4 is selected as the accumulated image, an image in which the damaged portion 4 is easily verified and which is useful for inspection and analysis is kept. On the other hand, since as the image in which the entire structure 2 is imaged, an image is selected such that the imaging range overlapping between the images is small and the coverage ratio of the imaging range in the 3D model 2a is equal to or more than the predetermined value, it is possible to reduce the number of selected images and to reduce the total data amount based on the selected images. Therefore, not only an image that allows the damaged portion 4 to be clearly checked but also an image that allows the presence or absence of damage in the other region not illustrated in the former image to be verified thereafter are allowed to be kept with a small amount of data.

Second Embodiment

Figure 2:
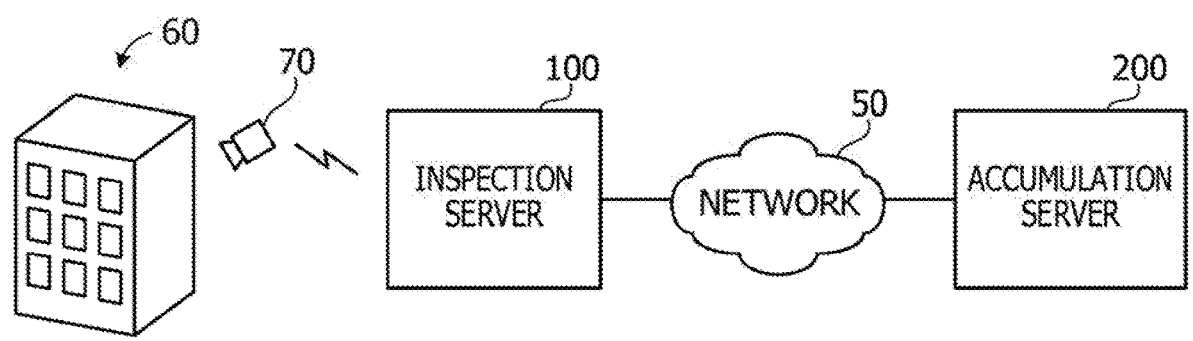
FIG. 2 is a diagram illustrating a configuration example of an information processing system according to a second embodiment.

FIG. 2 is a diagram illustrating a configuration example of an information processing system according to a second embodiment. The information processing system illustrated in FIG. 2 is a system used for maintaining and managing facilities (infrastructure) relating to social and economical infrastructures such as roads, railways, city water, communication, and the like. This information processing system includes an inspection server 100 and an accumulation server 200. The inspection server 100 and the accumulation server 200 are coupled to each other via a network 50.

The inspection server 100 is a server computer used to check whether or not there is any damage in a structure 60. The inspection server 100 acquires a captured image of the appearance of the structure 60 from a camera 70, and performs processing for inspecting whether or not the structure 60 is damaged based on the captured image. The imaging of the structure 60 by the camera 70 is performed a plurality of times so that the entire appearance of the structure 60 is captured exhaustively, and thus a plurality of captured images obtained by the imaging are input to the inspection server 100. The imaging of the structure 60 may be performed manually, or may be performed by using a robot such as a drone.

The inspection server 100 manages the information about the damaged portion as shape data on the 3D model of the structure 60. For example, the damaged portion is managed not only as a 2D shape on the captured image, but also as a 3D shape. This makes it possible to keep information useful for analyzing damaged portions and for later use.

The accumulation server 200 is a server computer that selects a captured image to be accumulated (for example, a captured image to be saved) from among a plurality of captured images of the structure 60 acquired by the inspection server 100 in response to a request from the inspection server 100. Hereinafter, the captured image selected to be accumulated will be referred to as an "accumulated image". In the present embodiment, the accumulation server 200 selects an accumulated image and accumulates the selected accumulated image in the storage device. The accumulation server 200 may select the accumulated image and notify the inspection server 100 of the selection result. The accumulation server 200 provides, for example, a service for selecting an accumulated image to the inspection server 100 as a Web service.

When the appearance of the structure 60 is captured exhaustively, a large number of captured images are obtained. The accumulation server 200 selects an image to be kept out of such a large number of captured images, reducing the amount of accumulated images.

When the inspection server 100 determines that the structure 60 has been damaged, the accumulation server 200 selects a captured image in which the damaged portion is imaged as an accumulated image. In this selection, a captured image from which the damaged portion is easily recognized is selected so as to enable analysis and subsequent verification of the damaged portion.

When only the captured image that has been determined to have a damaged portion imaged is kept, this does not guarantee that there is no damage in the other portions. This is because there may be damage that was not detected by visual observation or image processing from the original captured image. By keeping a captured image of a portion other than the damaged portion, it is possible to verify whether or not there was actually no damage later. Therefore, in the field of maintenance and management of infrastructures, there is a desire to keep a captured image of a portion other than a damaged portion to check change over the years.

However, if an image captured of a portion other than the damaged portion is to be kept, a large number of captured images are accumulated, so that the amount of accumulated data becomes enormous. Therefore, the accumulation server 200 selects a minimum number of images as captured images of portions other than the damaged portion, thereby reducing the amount of accumulated data of the images.

Figure 3:
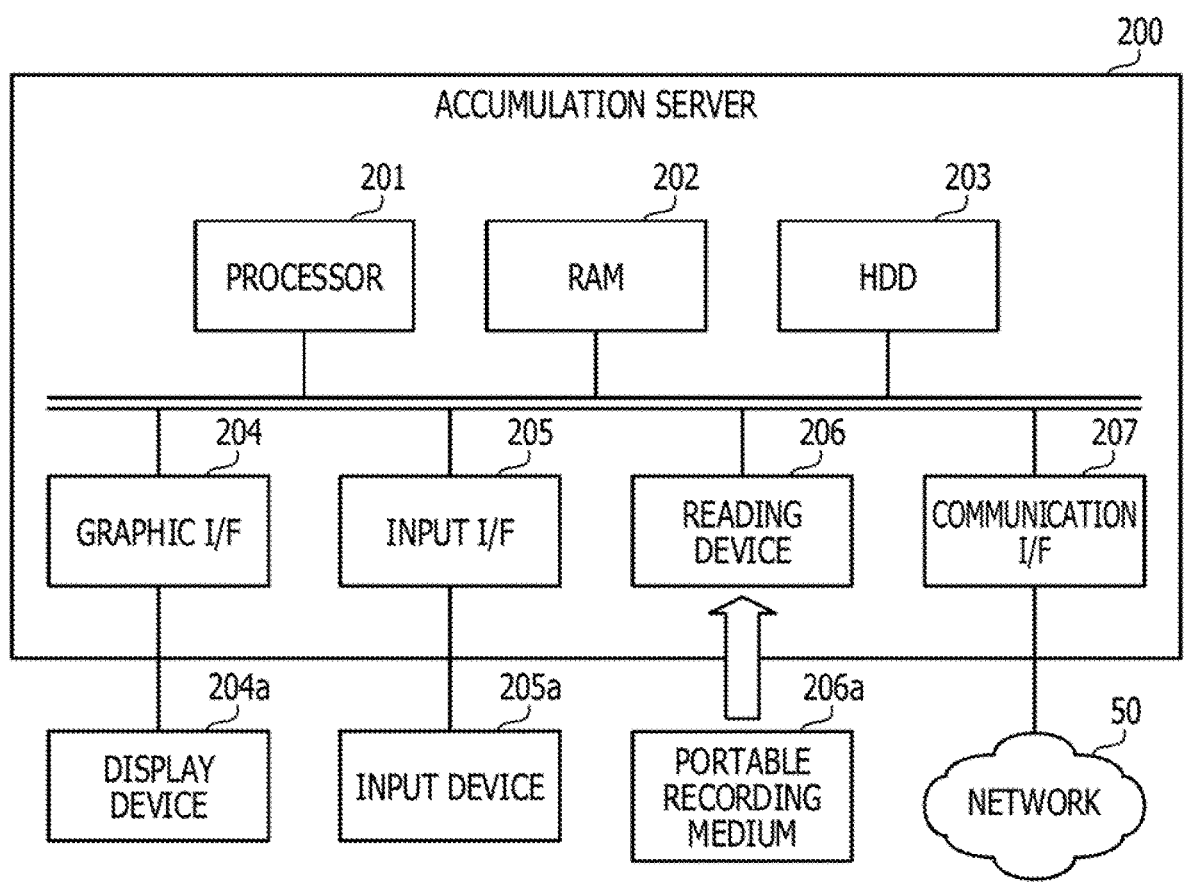
FIG. 3 is a diagram illustrating an example of a hardware configuration example of an accumulation server.

FIG. 3 is a diagram illustrating a hardware configuration example of an accumulation server. The accumulation server 200 is implemented, for example, as a computer as illustrated in FIG. 3. The accumulation server 200 illustrated in FIG. 3 includes a processor 201, a random-access memory (RAM) 202, a hard disk drive (HDD) 203, a graphic interface (I/F) 204, an input interface (I/F) 205, a reading device 206, and a communication interface (I/F) 207.

The processor 201 collectively controls the entire accumulation server 200. The processor 201 is, for example, a central processing unit (CPU), a microprocessor unit (MPU), a digital signal processor (DSP), an application specific integrated circuit (ASIC), or a programmable logic device (RD). The processor 201 may be a combination of 2 or more elements among a CPU, an MPU, a DSP, an ASIC, and a PLD.

The RAM 202 is used as a main storage device of the accumulation server 200. In the RAM 202, at least a part of an operating system (OS) program and an application program to be executed by the processor 201 is temporarily stored. In the RAM 202, various types of data used for processing by the processor 201 are stored.

The HDD 203 is used as an auxiliary storage device of the accumulation server 200. In the HDD 203, an OS program, application software, and various types of data are stored. As the auxiliary storage device, another kind of nonvolatile storage device such as a solid state drive (SSD) may be used.

To the graphic interface 204, a display device 204a is coupled. The graphic interface 204 displays an image on the display device 204a in accordance with a command from the processor 201. Examples of the display device 204a include a liquid crystal display and an organic electroluminescence (EL) display.

To the input interface 205, an input device 205a is coupled. The input interface 205 transmits a signal outputted from the input device 205a to the processor 201. Examples of the input device 205a include a keyboard and a pointing device. Examples of the pointing device include a mouse, a touch panel, a tablet, a touch pad, and a track ball.

To and from the reading device 206, a portable recording medium 206a is attached and detached. The reading device 206 reads data recorded in the portable recording medium 206a and transmits the data to the processor 201. Examples of the portable recording medium 206a include an optical disk, a magnetooptical disk, and a semiconductor memory.

The communication interface 207 performs transmission and reception of data with other devices such as the inspection server 100 via a network 50.

With a hardware configuration as described above, processing functions of the accumulation server 200 may be implemented. It is possible to also implement the inspection server 100 as a computer having a hardware configuration as illustrated in FIG. 3.

Figure 4:
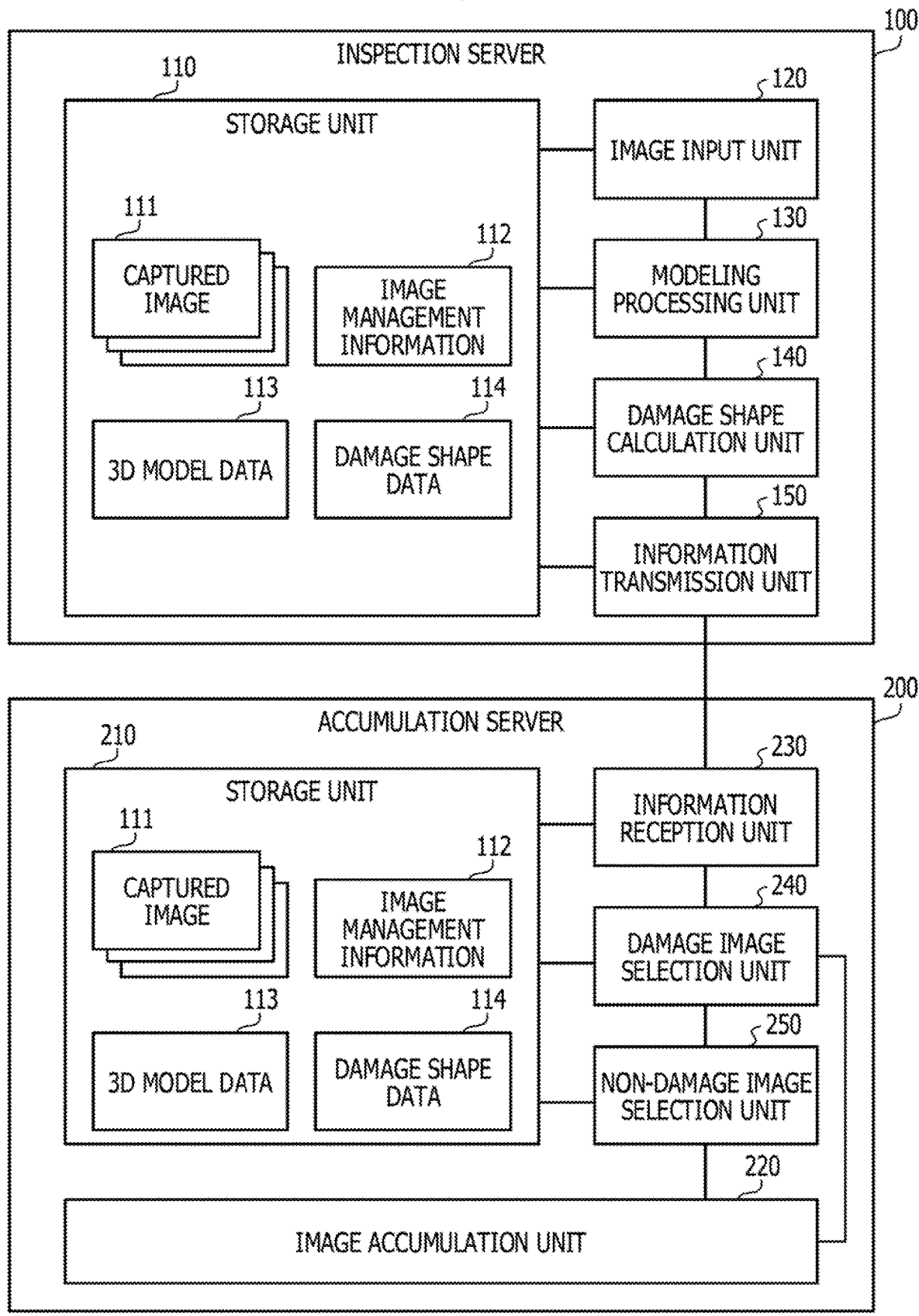
FIG. 4 is a block diagram illustrating a configuration example of processing functions included in an inspection server and an accumulation server.

FIG. 4 is a block diagram illustrating a configuration example of processing functions included in the inspection server and the accumulation server.

The inspection server 100 includes a storage unit 110, an image input unit 120, a modeling processing unit 130, a damage shape calculation unit 140, and an information transmission unit 150. The storage unit 110 is implemented, for example, as a storage region of a storage device (not illustrated) included in the inspection server 100. The processing of the image input unit 120, the modeling processing unit 130, the damage shape calculation unit 140, and the information transmission unit 150 is implemented by, for example, a processor (not illustrated) included in the inspection server 100 executing predetermined programs.

The storage unit 110 stores a captured image 111, image management information 112, 3D model data 113, and damage shape data 114.

The captured image 111 is an image obtained by the camera 70 capturing an image of the structure 60. The captured image 111 is acquired from the camera 70 by the image input unit 120, and is stored in the storage unit 110. As described above, a plurality of captured images 111 are generated by exhaustively imaging the surface of the structure 60, and are stored in the storage unit 110.

The image management information 112 holds metadata for each of the captured images 111. For example, the image management information 112 contains, for each captured image 111, a camera position and orientation indicating the position and orientation (direction) of the camera 70 at the time of imaging, internal parameters of the camera 70, and identification information indicating damage shape data 114 corresponding to a damaged portion appearing in the captured image 111.

The 3D model data 113 is data indicating a 3D model indicating the 3D shape of the structure 60. The 3D model data 113 contains, for example, data indicating one or both of a polyline and a polygon constituting a 3D model.

The damage shape data 114 indicates the 3D shape of the damaged portion in the 3D model of the structure 60. For example, the damage shape data 114 contains data indicating a polyline or a polygon corresponding to the damaged portion among the polylines and polygons constituting the 3D model.

The image input unit 120 receives input of a plurality of captured images 111 captured by the camera 70, and stores the captured images 111 in the storage unit 110. For example, a moving image is captured by the camera 70 while the position of the camera 70 is moved around the structure 60, and the moving image is input to the image input unit 120. The image input unit 120 thins out frames included in the input moving image at regular intervals to store a plurality of still images in the storage unit 110 as the captured images 111.

The modeling processing unit 130 estimates the camera position and orientation for each of the captured images 111 with the SfM based on the captured image 111, and restores the 3D shape of the structure 60 to generate a 3D model. The modeling processing unit 130 registers the estimated camera position and orientation in the image management information 112, and stores the data of the generated 3D model in the storage unit 110 as the 3D model data 113.

The damage shape calculation unit 140 specifies a captured image 111 in which the damaged portion is imaged from the captured images 111, and specifies the position of the damaged portion in the specified captured image 111. In the following description, a "damaged portion" refers to a portion where a group of damages has occurred.

The damage shape calculation unit 140 further creates damage shape data 114 indicating the 3D shape of the damaged portion in the 3D model based on the captured image 111 in which the damaged portion is imaged, the position of the damaged portion, and the 3D model data 113, and stores the damage shape data 114 in the storage unit 110. When there are a plurality of damaged portions in the structure 60, the damage shape data 114 is generated for each damaged portion, and is stored in the storage unit 110.

The information transmission unit 150 reads out all of the captured images 111, the image management information 112, the 3D model data 113, and all of the damage shape data 114 from the storage unit 110. The information transmission unit 150 transmits the read information to the accumulation server 200, and requests execution of a process for selecting an accumulated image from the captured images 111.

On the other hand, the accumulation server 200 includes a storage unit 210, an image accumulation unit 220, an information reception unit 230, a damage image selection unit 240, and a non-damage image selection unit 250. The storage unit 210 and the image accumulation unit 220 are implemented, for example, as storage regions of a storage device included in the accumulation server 200. The storage unit 210 may be a temporary storage region, and may be implemented by a volatile storage device such as the RAM 202. On the other hand, the image accumulation unit 220 is desirably implemented by a nonvolatile storage device such as the HDD 203. The image accumulation unit 220 may be implemented by a storage device coupled to the outside of the accumulation server 200. The processing of the information reception unit 230, the damage image selection unit 240, and the non-damage image selection unit 250 is implemented by, for example, the processor 201 included in the accumulation server 200 executing a predetermined program.

The storage unit 210 stores the captured images 111, the image management information 112, the 3D model data 113, and the damage shape data 114 that are transmitted from the inspection server 100.

The image accumulation unit 220 accumulates the captured images 111 selected as accumulated images.

When receiving a request for selecting an accumulated image from the inspection server 100, the information reception unit 230 stores the captured image 111, the image management information 112, the 3D model data 113, and the damage shape data 114 transmitted from the inspection server 100 in the storage unit 210. By the processing in the accumulation server 200, information indicating a polyline or a polygon appearing in the captured image 111 is registered in the image management information 112 for each captured image 111.

The damage image selection unit 240 calculates a projected area of the damaged portion in the captured image 111 based on the damage shape data 114 and the internal parameter of the camera 70 included in the image management information 112, from the captured image 111 in which the damaged portion is imaged. The damage image selection unit 240 selects the captured image 111 having the largest projected area of the damaged portion as an accumulated image, and stores the selected image in the image accumulation unit 220. Hereinafter, the captured image 111, which is selected as an accumulated image by the damage image selection unit 240 and in which a damaged portion is imaged, is referred to as a "damage image".

The non-damage image selection unit 250 selects, as an accumulated image, a captured image 111 in which the entire surface of the structure 60 is included in the imaging range from among the captured images 111 except those selected as the damage images among the captured images 111 in the storage unit 210, and stores the selected captured image in the image accumulation unit 220. Hereinafter, the captured image 111 selected as an accumulated image by the non-damage image selection unit 250 is referred to as a "non-damage image".

The non-damage image selection unit 250 selects the non-damage image such that the range over a certain percentage or more of the surface of the structure 60 is included in the imaging range with the damage image selected by the damage image selection unit 240 and the non-damage image, and the number of non-damage images is reduced as much as possible. At this time, the non-damage image selection unit 250 calculates the coverage ratio of the imaging range on the surface of the structure 60 by using the 3D model data 113 of the structure 60. For example, the non-damage image selection unit 250 selects the non-damage image such that the coverage ratio of the imaging range on the surface of the structure 60 becomes equal to or more than a predetermined value with the damage image and as small a number as possible of the non-damage image.

The arrangement of the processing functions in each server illustrated in FIG. 4 is merely an example, and the arrangement thereof may also be changed. For example, the processing function of the damage shape calculation unit 140 may be included in the accumulation server 200. The processing functions of the image input unit 120 and the modeling processing unit 130 may be included in the accumulation server 200. For example, the processing functions of the image input unit 120, the modeling processing unit 130, the damage shape calculation unit 140, the damage image selection unit 240, and the non-damage image selection unit 250 may be implemented in one server computer.

Figure 5:
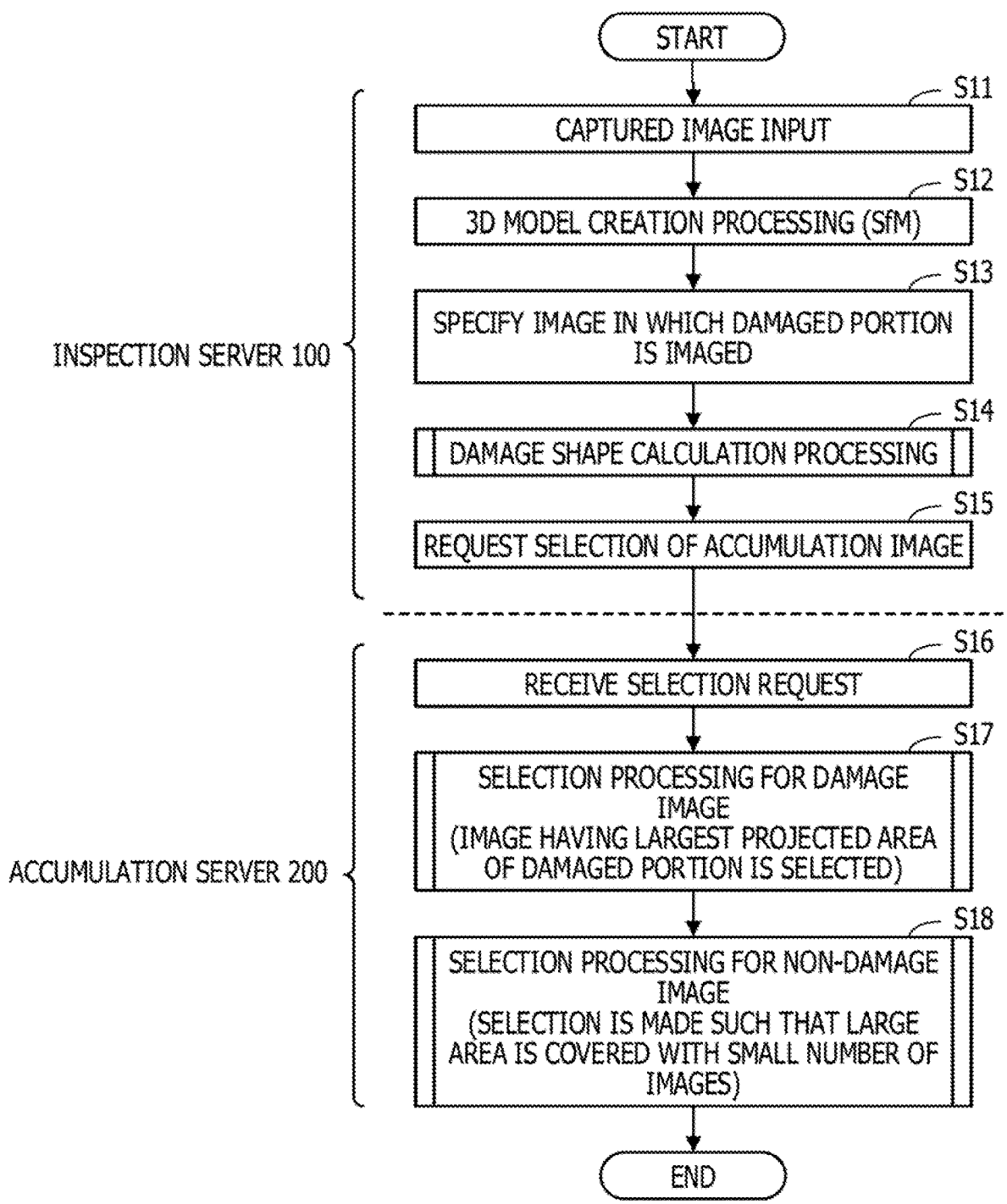
FIG. 5 is an example of a flowchart illustrating an overall processing procedure performed by the inspection server and the accumulation server.

FIG. 5 is an example of a flowchart illustrating an overall processing procedure performed by the inspection server and the accumulation server.

First, the processing in steps S11 to S15 is executed in the inspection server 100.

[Step S11] The image input unit 120 receives input of a plurality of captured images 111 captured of the structure 60, and stores these captured images 111 in the storage unit 110. As described above, the image input unit 120 may receive the input of a moving image captured by the camera 70. In this case, the image input unit 120 thins out frames included in the inputted moving image at regular intervals, and stores the frame (still image) remaining after the thinning in the storage unit 110 as the captured image 111.

[Step S12] Based on the captured image 111 in the storage unit 110, the modeling processing unit 130 estimates the camera position and orientation for each of the captured images 111 by SfM and restores the 3D shape of the structure 60 to create a 3D model. The modeling processing unit 130 registers the estimated camera position and orientation in the image management information 112, and stores the data of the generated 3D model in the storage unit 110 as the 3D model data 113.

The modeling processing unit 130 may generate a 3D model by using the 3D computer-aided design (CAD) data of the structure 60 in addition to the captured image 111. For example, the 3D model may be produced with high accuracy by aligning the 3D point cloud data of the structure 60 restored based on the captured image 111 and the 3D CAD data.

[Step S13] The damage shape calculation unit 140 specifies a captured image 111 in which the damaged portion is imaged from the captured images 111 in the storage unit 110. For example, the damage shape calculation unit 140 displays each captured image 111 on the display device, and accepts the selection of the captured image 111 in which the damaged portion is imaged by the operation of the operator. The damage shape calculation unit 140 may select the captured image 111 in which the damaged portion is imaged from the captured images 111 by image processing.

[Step S14] The damage shape calculation unit 140 creates damage shape data 114 indicating the 3D shape of the damaged portion in the 3D model based on the captured image 111 in which the damaged portion is imaged, the position of the damaged portion in the captured image 111, and the 3D model data 113. The damage shape calculation unit 140 stores the created damage shape data 114 in the storage unit 110. When there are a plurality of damaged portions in the structure 60, the damage shape data 114 is generated for each damaged portion, and is stored in the storage unit 110.

The position of the damaged portion in the captured image 111 is indicated by an operator's selection operation on the screen on which the captured image 111 is displayed on the display device, for example. When the captured image 111 having the damaged portion is specified by the image processing in step S13, the position of the damaged portion in the captured image 111 may be specified by the image processing.

[Step S15] The information transmission unit 150 reads out all of the captured images 111, the image management information 112, the 3D model data 113, and all of the damage shape data 114 from the storage unit 110. The information transmission unit 150 transmits the read information to the accumulation server 200 to request the accumulation server 200 to select an accumulated image.

Subsequently, the processing in steps S16 to S18 is executed in the accumulation server 200.

[Step S16] The accumulation server 200 receives a request for selecting an accumulated image from the inspection server 100, and stores the captured images 111, the image management information 112, the 3D model data 113, and the damage shape data 114 transmitted from the inspection server 100 in the storage unit 210.

[Step S17] The damage image selection unit 240 selects a damage image to be accumulated from the captured images 111 in which the damaged portion is imaged, and stores the selected damage image in the image accumulation unit 220. In this processing, the captured image 111 having the largest projected area of the damaged portion is selected as the damage image.

[Step S18] The non-damage image selection unit 250 selects a non-damage image to be accumulated from the captured images 111 except those already selected as the accumulated images among the captured images 111 in the storage unit 210, and stores the selected non-damage image in the image accumulation unit 220. In this process, the non-damage image is selected such that the imaging range with the damage image and as small a number as possible of non-damage images may cover as large a surface area as possible on the surface of the structure 60.

In the case where no image having a damaged portion imaged is specified in step S13, for example, in the case where it is not determined that the structure 60 is damaged, the processing in steps S14 and S17 is skipped.

Next, the damage shape calculation processing in step S14 will be described.

Figure 6:
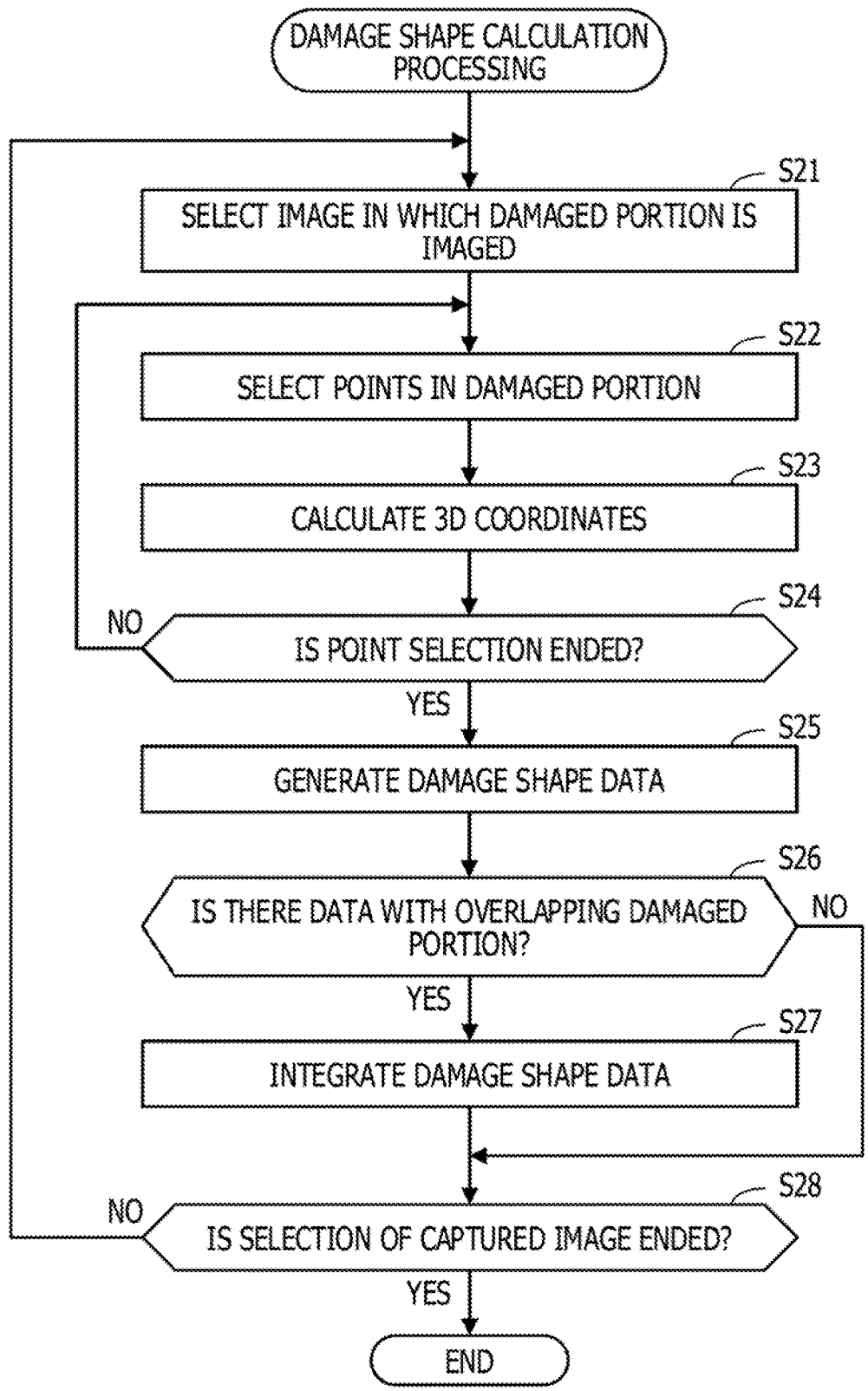
FIG. 6 is an example of a flowchart illustrating a procedure of damage shape calculation processing.

FIG. 6 is an example of a flowchart illustrating a procedure of the damage shape calculation processing.

[Step S21] The damage shape calculation unit 140 selects one captured image 111 in which the damaged portion is imaged from among the captured images 111 in the storage unit 110. In this processing, one image is selected from the captured images 111 specified as having the damaged portion imaged in step S13 in FIG. 5.

It is desirable that the processing in step S22 and subsequent steps is performed by using the captured image 111 obtained after the processing of removing the distortion of the image with respect to the captured image 111 selected in step S21.

[Step S22] The damage shape calculation unit 140 selects one point in the damaged portion included in the selected captured image 111. By the processing in step S22, the position of the damaged portion in the captured image 111 is specified.

The point in the damaged portion is selected as follows. For example, the damage shape calculation unit 140 displays the captured image 111 on the display device, and receives the instruction operation of the operator with respect to one point in the damaged portion in the displayed screen to select a point in the damaged portion. When the captured image 111 having the damaged portion is specified by the image processing in step S13 in FIG. 5, the position (2D coordinates) of the damaged portion in the captured image 111 may be specified by the image processing. In this case, the damage shape calculation unit 140 may select one pixel included in the specified damaged portion as a point in the damaged portion.

[Step S23] The damage shape calculation unit 140 calculates 3D coordinates on the 3D model corresponding to the point in the selected damaged portion based on the camera position and orientation for the selected captured image 111, the internal parameters of the camera 70, and the 3D model data 113. In this processing, for example, the damage shape calculation unit 140 calculates 3D coordinates of a point at which the optical axis passing through the point selected in step S22 (straight line orthogonal to the 2D coordinate plane corresponding to the captured image 111) intersects with the surface of the 3D model of the structure 60.

[Step S24] The damage shape calculation unit 140 determines whether to end the selection of a point in the damaged portion. When selecting another point in the damaged portion, the damage shape calculation unit 140 executes the processing in step S22, and when ending the selection of the point, executes the processing in step S25. It is desirable that as many points as possible in the damaged portion are selected.

[Step S25] Based on the 3D coordinates calculated in step S23, the damage shape calculation unit 140 creates damage shape data 114 indicating the 3D shape of the damaged portion. The damage shape data 114 is represented by a combination of a plurality of polylines or a combination of a plurality of polygons, among polylines or polygons constituting the 3D model. The damage shape calculation unit 140 registers identification information of the created damage shape data 114 as identification information indicating a damaged portion imaged in the captured image 111 selected in step S21 in the image management information 112.

[Step S26] The damage shape calculation unit 140 determines whether or not the damage shape data 114 newly created in step S25 overlaps with at least part of the damaged portion in the damage shape data 114 that has already been created. In this process, if at least one of the polylines or polygons is the same between the already created damage shape data 114 and the newly created damage shape data 114, it is determined that the damaged portion overlaps. When there is overlapping data, the damage shape calculation unit 140 executes the processing in step S27, and when there is no overlapping data, executes the processing in step S28.

[Step S27] The damage shape calculation unit 140 integrates 2 pieces of damage shape data 114, which are determined to have damaged portion overlapping in step S26, into 1 piece of damage shape data 114. As a result, a group of damaged portions is registered as 1 piece of damage shape data 114. At this time, the identification information of the damaged portions registered in the image management information 112 in step S25 is rewritten to identification information indicating the integrated damage shape data 114 that has been created.

[Step S28] The damage shape calculation unit 140 determines whether to end the selection of the captured image 111 in which the damaged portion is imaged. When there is any not selected in step S21 among the captured images 111 in which the damaged portion is imaged, the damage shape calculation unit 140 determines to continue the image selection, and executes the processing in step S21. On the other hand, when all of the captured images 111 in which the damaged portion is imaged have been selected in step S21, the damage shape calculation unit 140 determines to end the image selection, and ends the damage shape calculation processing.

Next, the selection process for a damage image illustrated in step S17 in FIG. 5 will be described.

Figure 7:
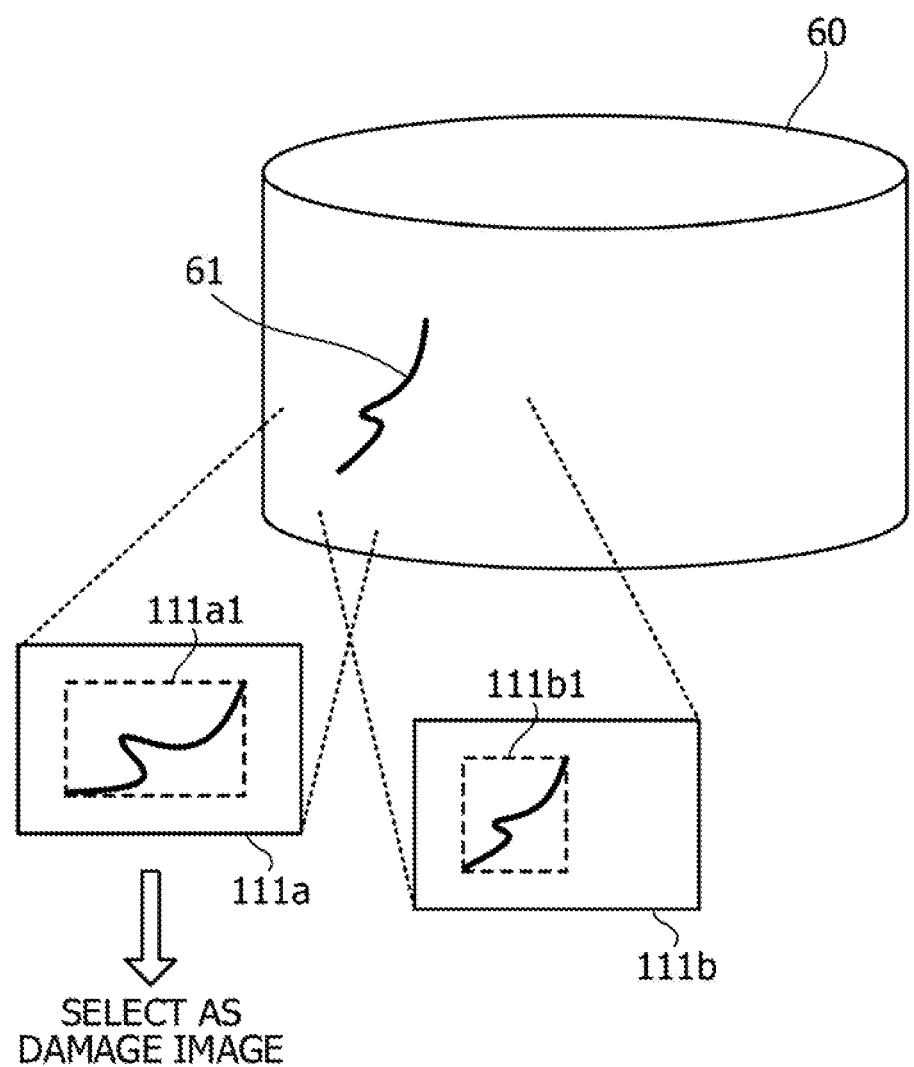
FIG. 7 is a diagram illustrating a example of selection process for a damage image.

FIG. 7 is a diagram illustrating an example of selection process for a damage image. The damage image selection unit 240 executes the following processing for each damaged portion, for example, for each piece of the damage shape data 114.

The damage image selection unit 240 specifies the captured image 111 in which the corresponding damaged portion is imaged from among the captured images 111 in the storage unit 210 based on the damage shape data 114, and the camera position and orientation and the internal parameters of the camera 70 in the image management information 112. The damage image selection unit 240 specifies a region in which a damaged portion is projected from each of the specified captured images 111, and calculates the area (projected area) of the projected region. The damage image selection unit 240 selects, from among the specified captured images 111, a captured image having the largest projected area of the damaged portion as a damage image to be accumulated, and stores the selected damage image in the image accumulation unit 220.

When the damage shape data 114 is represented by a combination of polylines, the damage image selection unit 240 calculates the 2D coordinates of the point at which each vertex of each polyline is projected in the captured image 111, for example. The damage image selection unit 240 creates the smallest rectangle (for example, circumscribed rectangle circumscribing the damaged portion) including all the projection points of the respective vertices in the captured image 111, and calculates the area of the created circumscribed rectangle as the projected area of the damaged portion.

In the example illustrated in FIG. 7, captured images 111a and 111b in which a damaged portion 61 on the structure 60 is imaged are specified. In the captured image 111a, a circumscribed rectangle 111a1 circumscribing the region of the damaged portion 61 is created, and in the captured image 111b, a circumscribed rectangle 111b1 circumscribing the region of the damaged portion 61 is created. Since the area of the circumscribed rectangle 111a1 is larger than that of the circumscribed rectangle 111b1, the captured image 111a is selected as a damage image corresponding to the damaged portion 61, and is accumulated in the image accumulation unit 220.

When the damage shape data 114 is represented by a combination of polygons, the damage image selection unit 240 calculates 3D coordinates of a point at which each vertex of the polygon is projected in the captured image 111, for example. The damage image selection unit 240 specifies the region enclosed by coupling the calculated projection points with straight lines as the region where the damaged portion is projected, and calculates the area of the specified region as the projected area of the damaged portion. The damage image selection unit 240 selects a captured image 111 having a maximum projected area as a damage image.

The projection position of the vertex of the polyline or polygon in the captured image 111 may be calculated by, for example, the following procedure. It is assumed that the 3D coordinates indicating the vertex of the polyline or polygon is represented by (Xc, Yc, Zc), and x=Xc/Zc, y=Yc/Zc, and $r^2=x^2+y^2$ are established. The 2D coordinates $(x^1, y^1)$ indicating the projection position of the vertex in the captured image 111 is calculated by the following equations (1) and (2).

$$x^1=x(1+k_1r^2+k_2r^4+k_3r^6)+(2p_1xy+p_2(2x^2+r^2)) \quad (1),$$

$$y^1=y(1+k_1r^2+k_2r^4+k_3r^6)+(p_1(2y^2r^2)+2p_2xy) \quad (2)$$

$k_1$, $k_2$, $k_3$, $p_1$, and $p_2$ represent the internal parameters of the camera 70.

Figure 8:
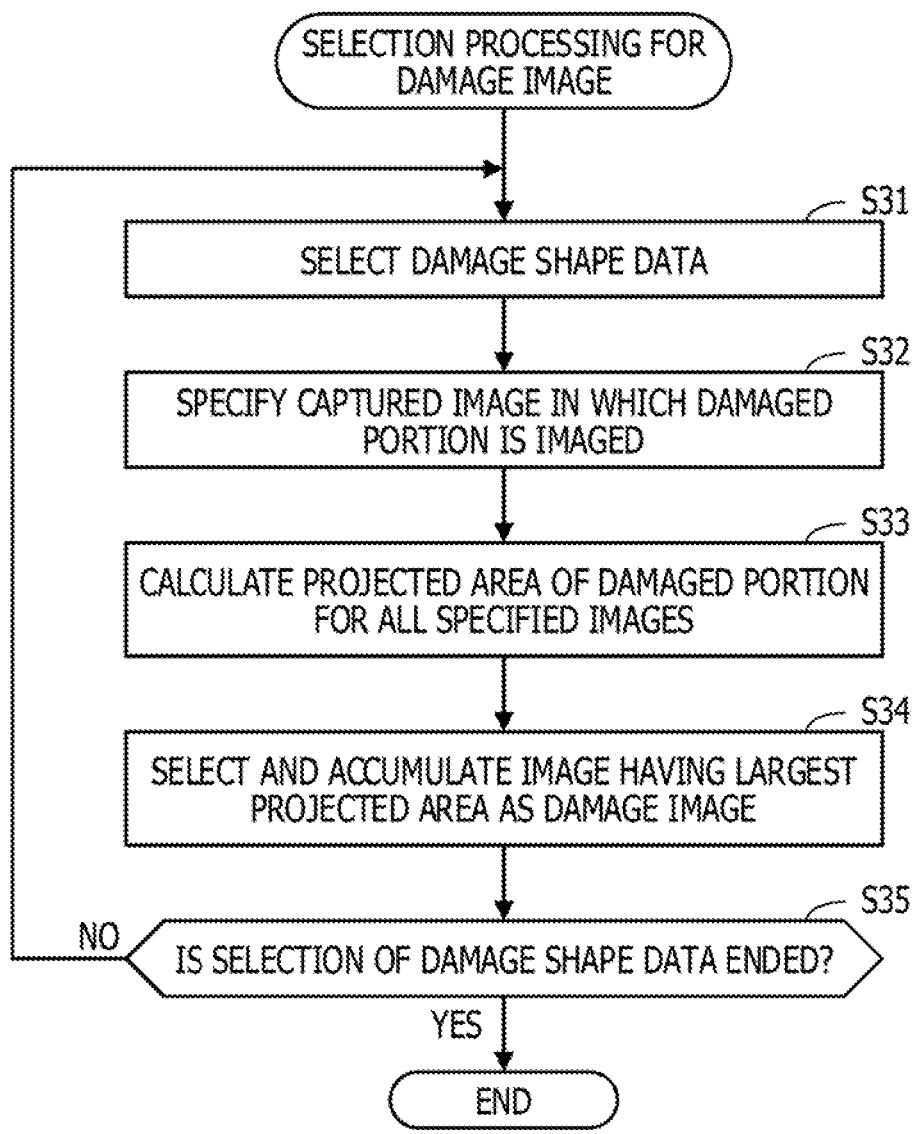
FIG. 8 is an example of a flowchart illustrating a procedure of a selection process for a damage image.

FIG. 8 is an example of a flowchart illustrating a procedure of a selection process for a damage image.

[Step S31] The damage image selection unit 240 selects one piece of damage shape data 114.

[Step S32] Based on the identification information of the damaged portion registered in the image management information 112, the damage image selection unit 240 specifies the captured image 111 in which the damaged portion corresponding to the selected damage shape data 114 is imaged from among the captured images 111 in the storage unit 210.

[Step S33] The damage image selection unit 240 calculates the projected area of the damaged portion in the captured image 111 for all the captured images 111 specified in step S32 according to the procedure described with reference to FIG. 7.

[Step S34] The damage image selection unit 240 selects, as a damage image, the image in which the projected area calculated in step S33 is the largest, from the captured images 111 specified in step S32, and stores and accumulates the selected image in the image accumulation unit 220.

[Step S35] The damage image selection unit 240 determines whether to end the selection of the damage shape data 114. When there is an unselected one among the pieces of damage shape data 114 in the storage unit 210 in step S31, the damage image selection unit 240 determines to continue the selection of the damage shape data 114, and executes the processing in step S31. On the other hand, when all of the pieces of damage shape data 114 in the storage unit 210 have been selected in step S31, the damage image selection unit 240 determines to end the selection of the damage shape data 114, and ends the selection process for the damage image.

Figure 9:
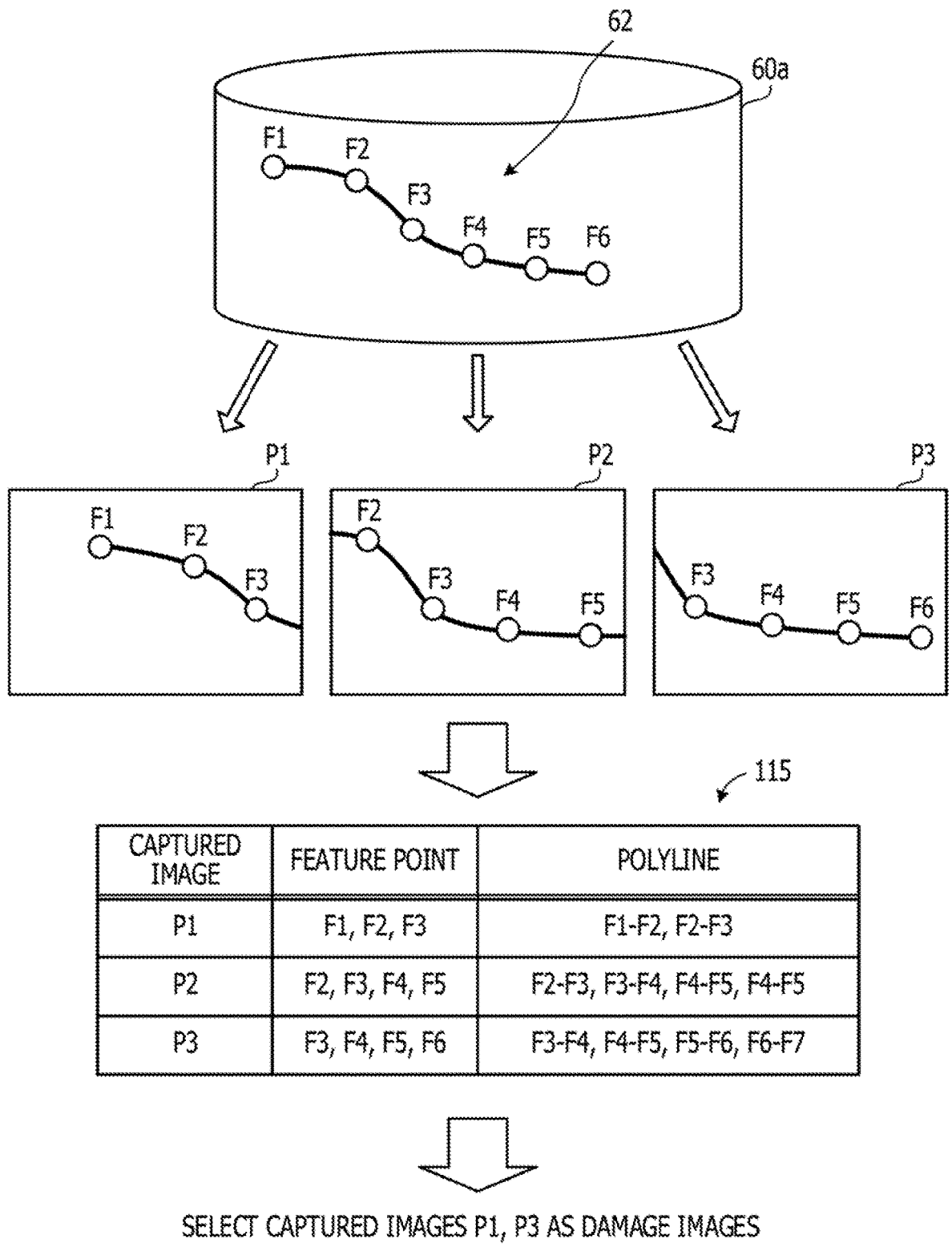
FIG. 9 is a diagram illustrating an example of selection process for a damage image in a case where there is no captured image including the entire damaged portion.

FIG. 9 is a diagram illustrating an example of the selection process of the damage image in the case where there is no captured image including the entire damaged portion. In step S32 in FIG. 8, the captured image 111 in which the entire damaged portion is imaged is specified. Depending on the size of the damaged portion and the situation at the time of imaging, there may be no captured image 111 in which the entire one damaged portion is imaged. In this case, the damage image is selected by the following procedure, for example.

In the example of FIG. 9, it is assumed that a linear damaged portion 62 represented by a polyline passing through the feature points F1 to F6 is present on the 3D model 60a of the structure 60. For example, damage shape data 114 indicating the damaged portion 62 is represented by the polylines F1-F2, F2-F3, F3-F4, F4-F5, and F5-F6.

It is assumed that the captured images P1 to P3 in each of which the damaged portion 62 is imaged are specified from the captured images 111 in the storage unit 210. It is assumed that the feature points F1 to F3 are projected onto the captured image P1, the feature points F2 to F5 are projected onto the captured image P2, and the feature points F3 to F6 are projected onto the captured image P3. In this way, it is assumed that only a part of the damaged portion 62 is imaged in any of the captured images P1 to P3.

In this case, the damage image selection unit 240 allows a plurality of damage images to be selected for the one damaged portion 62. At this time, the damage image selection unit 240 selects damage images such that the entire damaged portion 62 may be covered with as small a number as possible of damage images (such that the entire damaged portion 62 is included in the imaging range).

For example, the damage image selection unit 240 determines the feature points projected in the image for each of the captured images P1 to P3. In this processing, by calculating the 2D coordinates of each feature point (vertex) on the polyline in the captured images P1 to P3 by using Equations (1) and (2), the feature points projected into the image from the feature points F1 to F6 are determined. Alternatively, when a 3D model is generated by SfM in step S12 of FIG. 5, point cloud data of feature points extracted from each captured image 111 may be used. For example, the damage image selection unit 240 compares the feature points extracted from the captured images P1 to P3 with the feature points on the polyline of the damaged portion 62 to determine the feature points projected onto each of the captured images P1 to P3.

Next, the damage image selection unit 240 determines the polylines projected onto each of the captured images P1 to P3 from the determination result of the feature points. Based on the determination result, the damage image selection unit 240 selects a damage image such that the entire polyline corresponding to the damaged portion 62 may be covered by a small number of damage images from the captured images P1 to P3. This makes it possible to reduce the number of damage images to be accumulated, and to reduce the amount of accumulated data.

A table 115 illustrated in FIG. 9 is a list of feature points and polylines projected onto each of the captured images P1 to P3. For example, the damage image selection unit 240 creates such a table 115, and selects a damage image based on the table 115. According to the example of the table 115, the polylines F1-F2, F2-F3 are projected onto the captured image P1, and all of the remaining polylines F3-F4, F4-F5, and F5-F6 are projected onto the captured image P3. As described above, since the entire polylines corresponding to the damaged portion 62 are covered by the two captured images P1 and P3, the captured images P1 and P3 are selected as damage images, and are accumulated in the image accumulation unit 220.

Next, the selection process of a non-damage image illustrated in step S18 in FIG. 5 will be described. First, a first processing example for selecting a non-damage image will be described with reference to FIGS. 10A to 13.

Figure 10A:
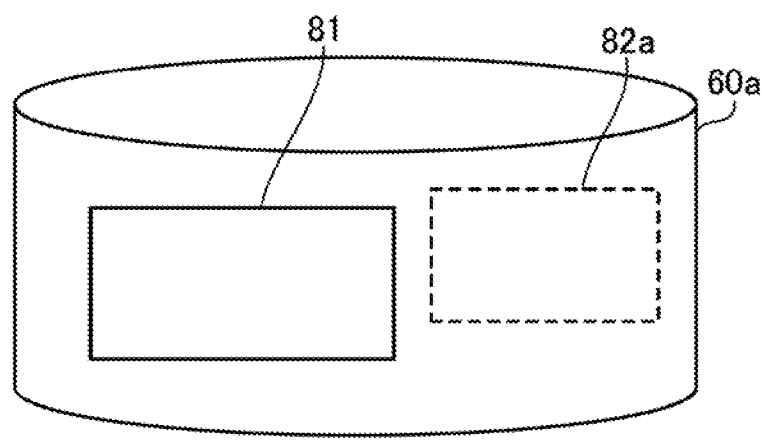
FIGS. 10A to 10C are diagrams for explaining an overview of a first processing example for selecting a non-damage image.
Figure 10B:
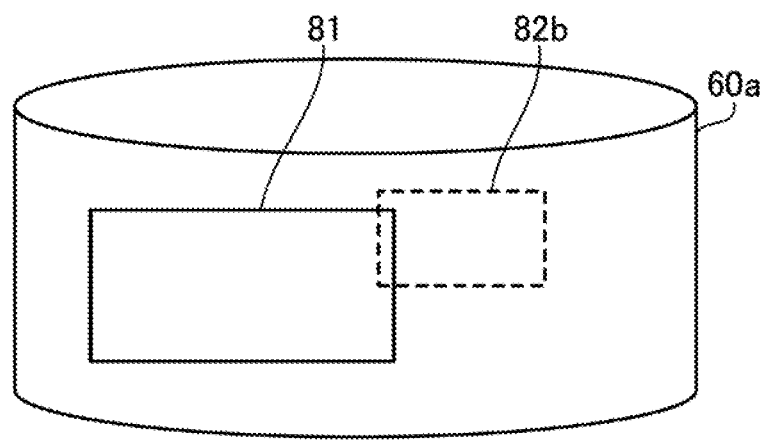
Figure 10C:
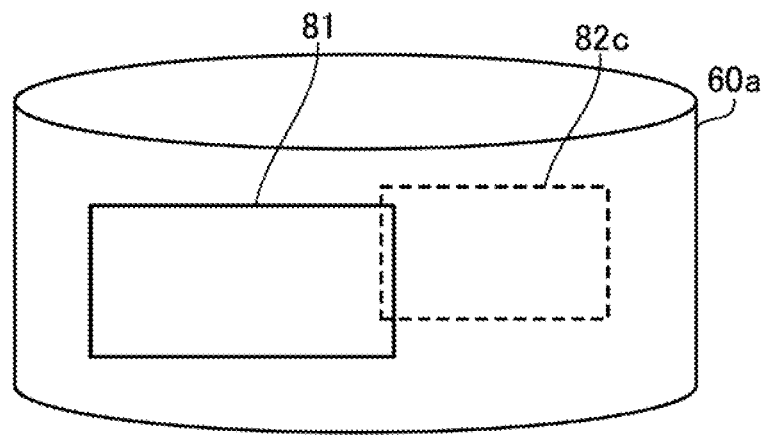

FIGS. 10A to 10C are diagrams for explaining an overview of the first processing example for selecting a non-damage image.

As described above, the non-damage image selection unit 250 selects a non-damage image to be accumulated from the captured images 111 except those already selected as the accumulated images among the captured images 111 in the storage unit 210, and accumulates the selected non-damage image in the image accumulation unit 220. At this time, the non-damage image selection unit 250 selects the non-damage image such that the imaging range with the damage image and as small a number as possible of non-damage images may cover the area as large as possible on the surface of the structure 60. The non-damage image selection unit 250 calculates the imaging range of an image in the structure 60 as an imaging range in the 3D model of the structure 60 based on the 3D model data 113.

When one or more accumulated images have already been selected, the non-damage image selection unit 250 selects a candidate image to be selected as the next accumulated image (non-damage image) one by one from among the remaining captured images 111 except those selected as the accumulated image among the captured images 111 in the storage unit 210. The non-damage image selection unit 250 calculates a total area of cover ranges covered by both of the imaging range by the selected accumulated image and the imaging range by the candidate image, in the surface region of the 3D model. At the same time, the non-damage image selection unit 250 calculates the peripheral length of the cover range.

The non-damage image selection unit 250 calculates the ratio of the total area to the peripheral length as an evaluation value, and selects the candidate image with the highest evaluation value as a non-damage image (for example, a new accumulated image). Thus, when the candidate image is selected as a non-damage image, a candidate image that makes the total area as large as possible and the peripheral length as short as possible is selected as a non-damage image.

In the example of FIGS. 10A to 10C, it is assumed that the region 81 in the 3D model 60a is covered by the imaging range by one or more selected accumulated images. The selected accumulated image includes at least a damage image. If one or more non-damage images have already been selected, the selected accumulated images include a damage image and a selected non-damage image.

On the other hand, in the example of FIGS. 10A to 10C, it is assumed that there are three captured images 111 which are not selected as accumulated images. As illustrated in FIG. 10A, it is assumed that the region 82a in the 3D model 60a is covered by the imaging range of the first captured image 111. As illustrated in FIG. 10B, it is assumed that the region 82b in the 3D model 60a is covered by the imaging range of the second captured image 111. As illustrated in FIG. 10C, it is assumed that the region 82c in the 3D model 60a is covered by the imaging range of the third captured image 111.

When the cases of FIGS. 10A and 10B are compared with each other, in the case of FIG. 10A, the total area of the cover ranges covered by the regions 81 and 82a is large, and the peripheral length of the cover ranges is also long. On the other hand, in the case of FIG. 10B, the total area of cover ranges covered by the regions 81 and 82b is small, and the peripheral length of the cover ranges is short. When parts of the regions 81 and 82b overlap with each other as illustrated in FIG. 10B, the cover range by the regions 81 and 82b indicates a range obtained by coupling the regions 81 and 82b.

In the case of FIG. 10C, the total area of cover ranges covered by the regions 81 and 82c is equal to the total area in FIG. 10A, and is larger than the total area in FIG. 10B. The peripheral length of the cover range by the regions 81 and 82c is longer than the peripheral length in FIG. 10B, but is shorter than the peripheral length in FIG. 10A. In comparison with FIG. 10A, the peripheral length is increased by the amount corresponding to four sides of the region 82a in FIG. 10A, while the peripheral length is increased only by approximately three sides of the region 82c in FIG. 10C. As a result, the evaluation value of the ratio of the total area to the peripheral length is the highest in the case of FIG. 10C, and the third captured image 111 corresponding to the region 82c is selected as the non-damage image.

According to the above processing, when the imaging range by a newly added candidate image is added to the imaging range by the captured image 111 already selected as the accumulated image, the candidate image in which the increase amount of the cover range by the additional imaging range is large and parts of the imaging ranges are overlapped is selected as the non-damage image. In order to cover the entire surface of the 3D model with a small number of images, it is desirable that the area of the new non-damage image is large and that the non-damage image overlaps with the existing cover range. When viewed in the entire accumulated image, it is desirable that the overlapping area between adjacent accumulated images be small. Since the non-damage image is selected under the above-described conditions of the total area and the peripheral length, an accumulated image having a small overlapping area in which parts thereof overlaps with an adjacent accumulated image is small and having a large area is selected as a whole. This allows the entire surface of the 3D model to be covered with a small number of non-damage images, thus reducing the amount of accumulated data of the non-damage images.

Figure 11:
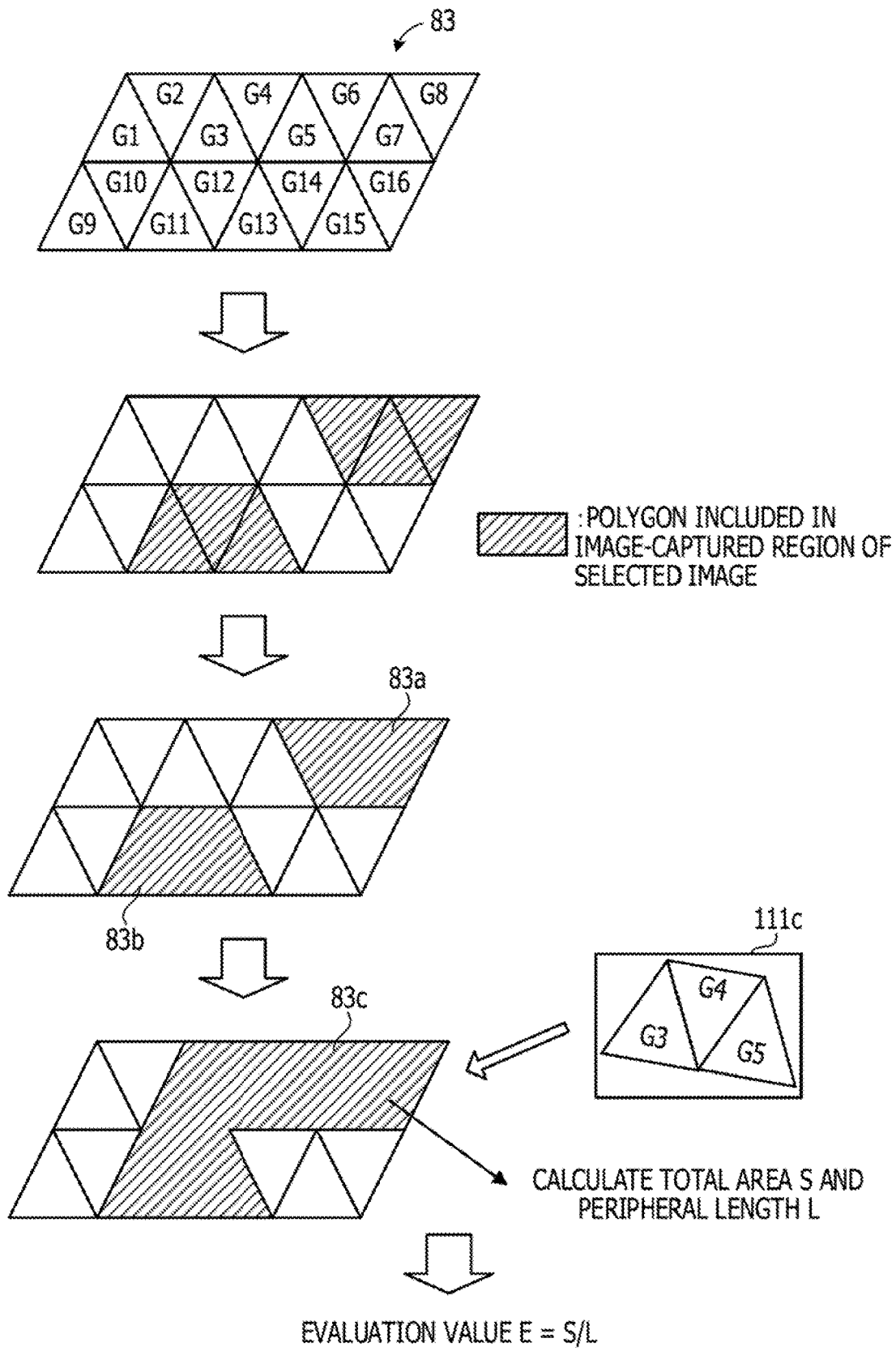
FIG. 11 is a diagram illustrating an example of calculation of an evaluation value using polygons.

FIG. 11 is a diagram illustrating an example of calculation of an evaluation value using polygons.

The non-damage image selection unit 250 calculates the imaging range by the image in the structure 60 using the 3D model data 113 of the structure 60. When polygons of the 3D model data 113 are used, an imaging range by a certain image in the structure 60 is indicated by polygons imaged (projected) in the image among the polygons on the 3D model.

The region 83 illustrated in FIG. 11 indicates a part of the 3D model of the structure 60. The region 83 includes polygons G1 to G16. It is assumed that the polygons G6 to G8 and G11 to G13 indicated by hatching among the polygons G1 to G16 are included in the imaging range by the captured image 111 already selected as the accumulated image.

At this time, the non-damage image selection unit 250 combines polygons included in the imaging range and having sides (a straight line coupling the vertices) adjacent to each other. In the example illustrated in FIG. 11, the region 83a is generated by combining the polygons G6 to G8, and the region 83b is generated by combining the polygons G11 to G13.

It is assumed that there is a captured image 111c which is not selected as an accumulated image and the polygons G3 to G5 are included in the imaging range by the captured image 111c. The non-damage image selection unit 250 calculates the total area S and the peripheral length L of the cover region in the case where the captured image 111c is added as a non-damage image. For example, when the captured image 111c is added as a non-damage image, the region 83c obtained by combining the polygons G3 to G8 and G11 to G13 is covered as an imaging range in the 3D model. Therefore, the non-damage image selection unit 250 calculates the total area S and the peripheral length L of the region 83c, and calculates (S/L) as the evaluation value E.

In the processing illustrated in FIG. 11, since the area and the peripheral length of each polygon are the same, it is possible to easily calculate the area of the range covered by the imaging range from the number of polygons included in the imaging range. It is possible to easily calculate the peripheral length of the range covered by the imaging range based on the positional relationship of the polygons included in the imaging range.

Figure 12:
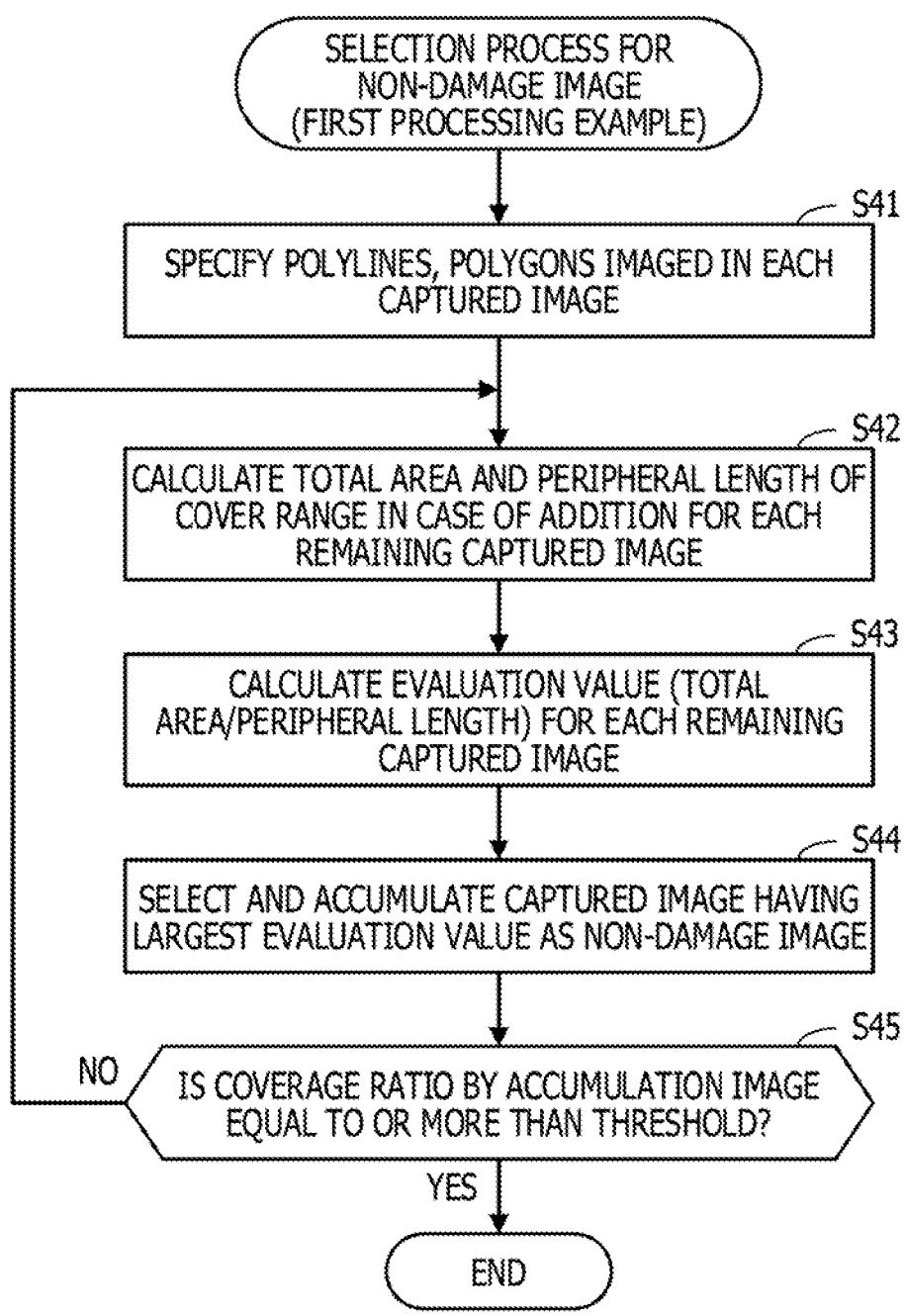
FIG. 12 is a flowchart illustrating a first processing example for selecting a non-damage image.

FIG. 12 is a flowchart illustrating a first processing example for selecting a non-damage image.

[Step S41] The non-damage image selection unit 250 specifies polylines or polygons imaged in each of the captured images 111 in the storage unit 210. In this processing, based on the 3D coordinates of the vertices of the polylines or polygons and the internal parameters of the captured image 111, the 2D coordinates of the vertices in the captured image 111 are obtained by using the above equations (1) and (2). When the 2D coordinates of the vertex are calculated as coordinates within the range of the captured image 111, it is determined that the vertex is imaged in the captured image 111. The non-damage image selection unit 250 registers information of the polylines or polygons imaged in the captured image 111 in the image management information 112 for each of the captured images 111.

[Step S42] The non-damage image selection unit 250 executes the following processing for each of the remaining captured images 111 which are not selected as accumulated images (damage image or non-damage image) at the present time. The non-damage image selection unit 250 calculates the total area and the peripheral length of the cover ranges covered by the imaging range in the 3D model in the case where a captured image 111 is added as a non-selected image and the imaging range by the already selected accumulated image.

[Step S43] The non-damage image selection unit 250 calculates (total area/peripheral length) as an evaluation value based on the calculation result in step S42 for each of the remaining captured images 111.

[Step S44] The non-damage image selection unit 250 selects the captured image 111 having the largest evaluation value among the remaining captured images 111 as a new non-damage image, and stores the selected image in the image accumulation unit 220.

[Step S45] The non-damage image selection unit 250 determines whether or not the coverage ratio in the range covered by the imaging range of all the accumulated images at the present time is equal to or more than a predetermined threshold. This coverage ratio is calculated, for example, as the ratio of the total area of the polygons included in the imaging range of the current accumulated images to the surface area (total area of all polygons) of the entire 3D model of the structure 60. When the coverage ratio is less than the threshold, the non-damage image selection unit 250 executes the process of step S42, and when the coverage ratio is equal to or more than the threshold, the non-damage image selection unit 250 ends the selection process for a non-damage image.

Figure 13:
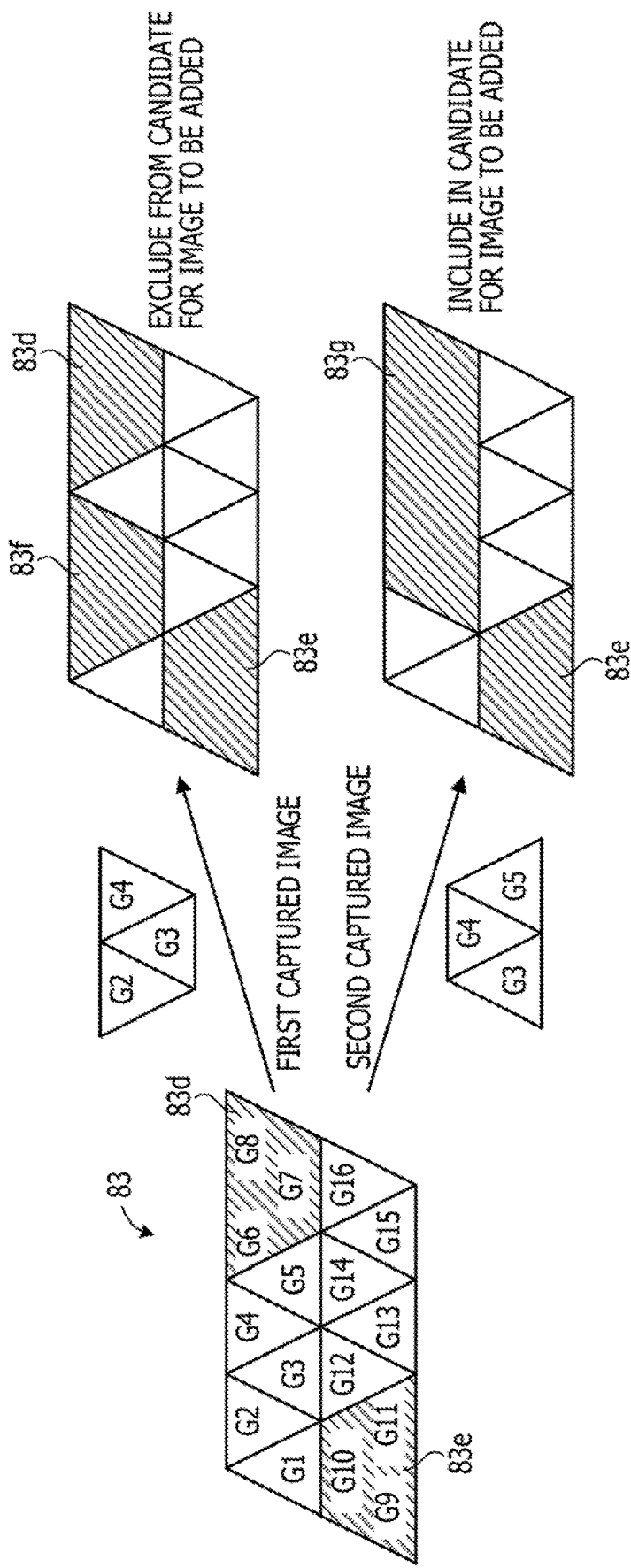
FIG. 13 is a diagram illustrating a processing example for increasing the efficiency of selection of a non-damage image.

FIG. 13 is a diagram illustrating a processing example for increasing the efficiency of the selection of a non-damage image. In step S42 in FIG. 12, the total area and the peripheral length of the cover range are calculated for all of the remaining captured images 111. However, the non-damage image selection unit 250 may narrow down candidates for non-damage images (the calculation target for the total area and the peripheral length) from among the remaining captured images 111 based on the positional relationship between the imaging range by the already selected accumulated images and the imaging range of the remaining captured images 111.

For example, it is assumed in FIG. 13 that in the region 83 in the 3D model of the structure 60, the polygons G6 to G11 are included in the imaging range of the already selected accumulated images. In this case, the cover range in the 3D model includes two coupling regions, for example, a coupling region 83d obtained by combining the'polygons G6 to G8 and a coupling region 83e obtained by combining the polygons G9 to G11. A case is considered in which it is determined whether the first and second captured images 111 are selected as a candidate for a non-damage image from this state.

The imaging range of the first captured image 111 includes polygons G2 to G4. Assuming that the first captured image 111 is selected as a non-damage image, the polygons G2 to G4 and G6 to G11 are covered. In this cover range, a new coupling region, which is separated from the coupling regions 83d and 83e described above, is increased as a coupling region 83f obtained by coupling the polygons G2 to G4.

On the other hand, it is assumed that the imaging range of the second image includes the polygons G3 to G5. Assuming that the second captured image 111 is selected as a non-damage image, the polygons G3 to G11 are covered. The cover range includes two coupling regions, for example, the coupling region 83e described above and the coupling region 83g obtained by combining the polygons G3 to G8, and the number of coupling regions does not increase from before the addition of the second captured image 111.

The aforementioned evaluation value becomes higher as the peripheral length of the cover range becomes smaller when a new non-damage image is added. However, in the case where the first captured image 111 is added as in FIG. 13, if the number of regions separated from each other included in the cover range is increased by the addition, there is a high possibility that the peripheral length of the cover range becomes long. In view of this, when the number of regions separated from each other is increased after a captured image 111 is added like the second captured image 111, the non-damage image selection unit 250 excludes the captured image 111 from the candidate for a non-damage image and skips the process of calculating the total area and the peripheral length of the cover range. This makes it possible to reduce the selection process load for a non-damage image.

However, when a non-damage image is not allowed to be added without increasing the number of regions, the non-damage image selection unit 250 selects only a captured image 111 that makes the number of increased regions small, for example, as a candidate for a non-damage image, and calculates the total area and the peripheral length of the cover region and the evaluation value.

Next, a second processing example for selecting a non-damage image will be described with reference to FIGS. 14 and 15. The non-damage image selection unit 250 may select a non-damage image according to the following procedure.

Figure 14:
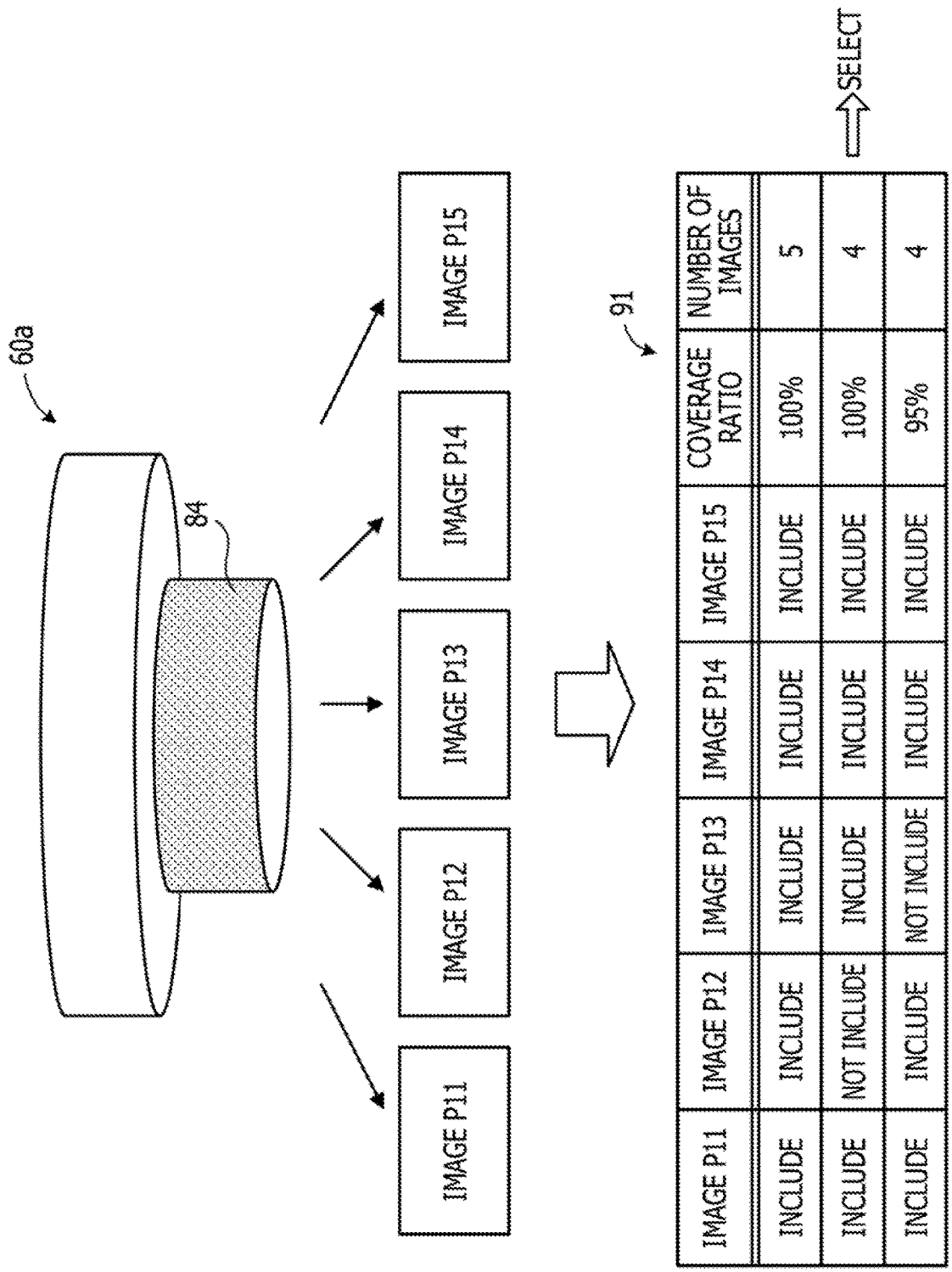
FIG. 14 is a diagram for explaining an overview of a second processing example for selecting a non-damage image.

FIG. 14 is a diagram for explaining an overview of a second processing example for selecting a non-damage image.

In the second processing example, the non-damage image selection unit 250 divides the 3D model of the structure 60 into a plurality of partial regions. The partial regions are divided, for example, in surface unit of the 3D model. The non-damage image selection unit 250 calculates, for each partial region, a combination of the captured images 111 that allows the partial region to be covered with a minimum number of captured images 111 (or to be included in the imaging range), and selects a captured image 111 included in the combination as a non-damage image. Calculation of a combination of the captured images 111 that allows the entire surface of the 3D model to be covered with a minimum number of captured images 111 will result in an enormous amount of calculation. By calculating such a combination in unit of partial region, the amount of calculation may be reduced.

In the example illustrated in FIG. 14, it is assumed that the images P11 to P15 are present as captured images 111 in which the partial region 84 in the 3D model 60a of the structure 60 is included in the imaging range. In the table 91, a combination of images that covers a region equal to or more than a predetermined coverage ratio in the partial region 84 is illustrated by using the images P11 to P15. Here, as an example, a threshold of the coverage ratio is set to 95%. As illustrated in the table 91, it is assumed that the combination of the images P11 to P15, the combination of the images P11 and P13 to P15, and the combination of the images P11, P12, P14, and P15 are extracted as the combinations as described above.

In this case, the non-damage image selection unit 250 selects a combination that minimizes the number of images from among the combinations having high coverage ratios. In the example of the table 91, the combination of the images P11 and P13 to P15 is selected. For example, the images P11 and P13 to P15 are selected as non-damage images.

Figure 15:
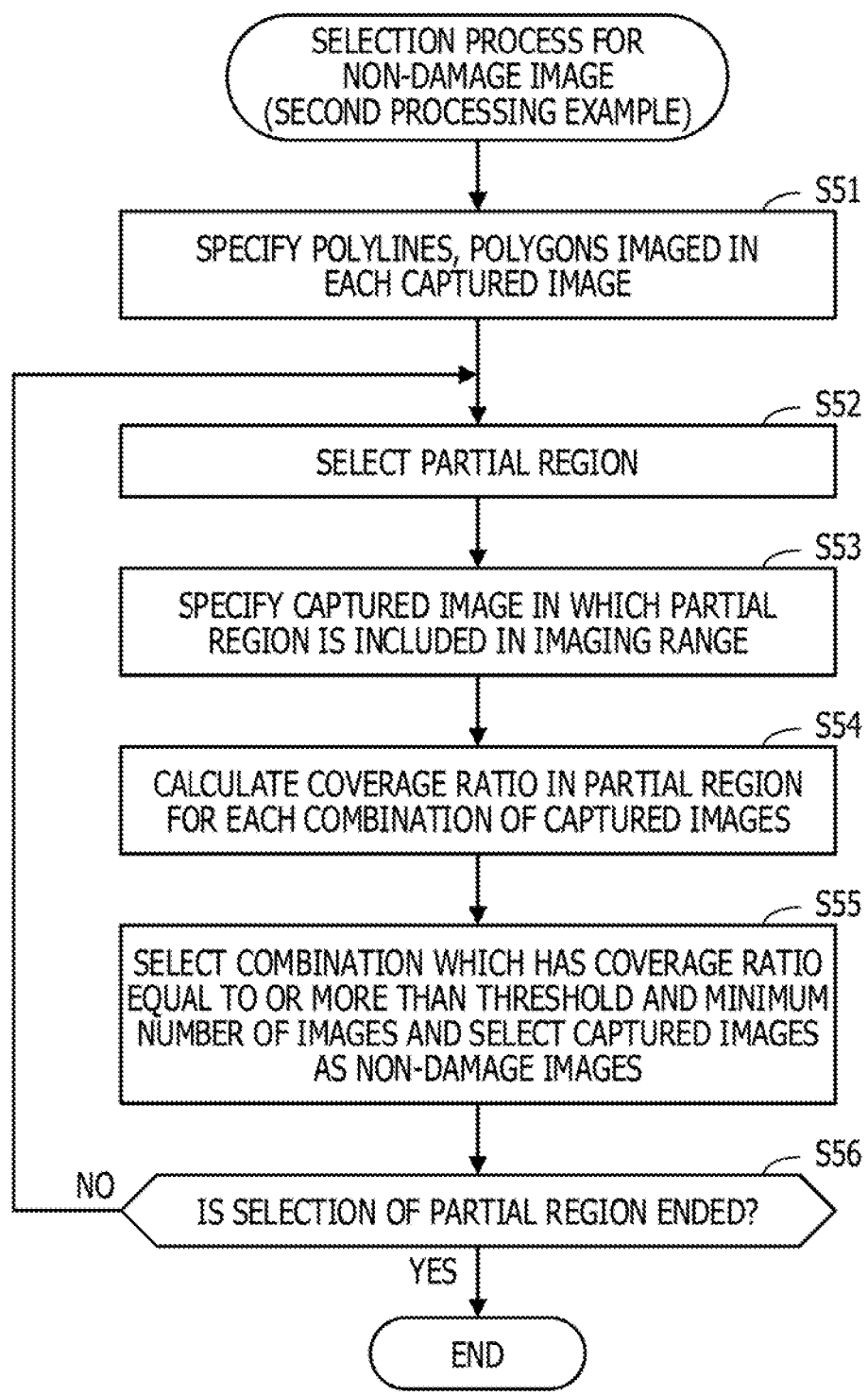
FIG. 15 is a flowchart illustrating the second processing example for selecting a non-damage image.

FIG. 15 is a flowchart illustrating the second processing example for electing a non-damage image.

[Step S51] The non-damage image selection unit 250 specifies polylines or polygons imaged in each of the captured images 111 in the storage unit 210 by the same procedure as in step S41 in FIG. 12. The non-damage image selection unit 250 registers information of the polylines or polygons imaged in the captured image 111 in the image management information 112 for each of the captured images 111.

[Step S52] The non-damage image selection unit 250 selects one partial region in the 3D model of the structure 60 based on the 3D model data 113.

[Step S53] The non-damage image selection unit 250 specifies a captured image 111 including the selected partial region in the imaging range from the captured images 111 in the storage unit 210. In this processing, based on the information registered in the image management information 112 in step S51, a captured image 111 including one or more polylines or polygons included in the partial region is specified. In the case where a damaged portion is included in the partial region, a damage image corresponding to the damaged portion is also specified.

[Step S54] The non-damage image selection unit 250 calculates the coverage ratio in the partial region for each of the combinations of the captured images 111 specified in step S53. In this processing, when the damage image is specified in step S53, the coverage ratio is calculated for all combinations that include the damage image. The coverage ratio is calculated as a percentage of the region covered by the imaging range of each captured image 111 included in the combination among the partial regions.

[Step S55] The non-damage image selection unit 250 selects a combination which has a coverage ratio equal to or more than a predetermined threshold and which minimizes the number of images from among the combinations in each of which the coverage ratio is calculated in step S54. The non-damage image selection unit 250 selects a captured image 111 included in the selected combination (except for the damage image) as a non-damage image, and stores the selected image in the image accumulation unit 220.

[Step S56] The non-damage image selection unit 250 determines whether to end the selection of the partial region. If there is a partial region unselected in step S52 among the partial regions included in the 3D model, the non-damage image selection unit 250 determines to continue selecting a partial region, and executes the processing in step S52. On the other hand, when all the partial regions have been selected in step S52, the non-damage image selection unit 250 determines to end the selection of the partial regions, and ends the selection process for a non-damage image.

According to the processing illustrated in FIG. 15 described above, an accumulated image is selected such that the coverage ratio becomes equal to or larger than the threshold for each partial region. As a result, an accumulated image is selected such that a region of a certain percentage or more of the surface of the 3D model is covered.

MODIFICATIONS

Next, modifications in which part of the processing in the second embodiment is modified will be described.

Figure 16:
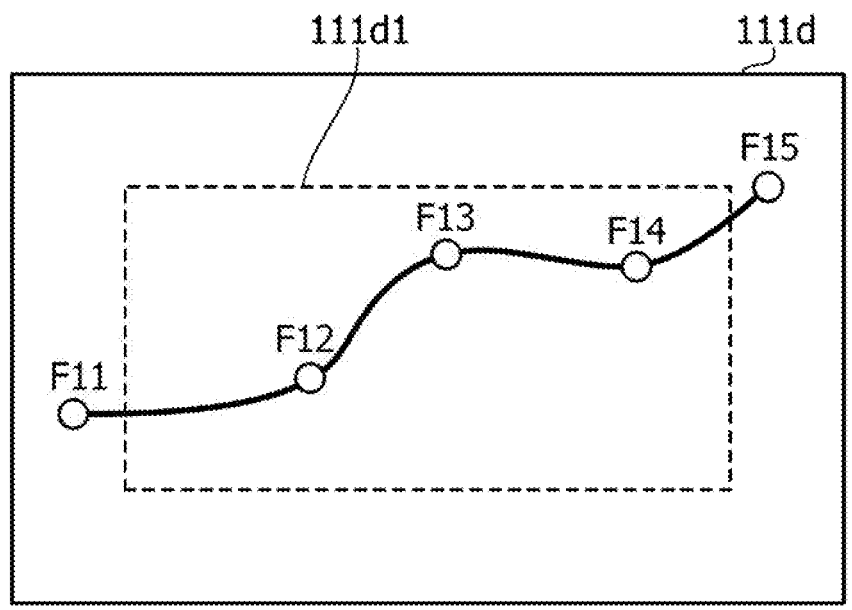
FIG. 16 is a diagram for explaining a first modification.

FIG. 16 is a diagram for explaining a first modification. In a captured image by a camera, distortion becomes larger at a position closer to an end portion. In view of this, in the processing using the captured images 111 stored in the storage units 110 and 210, only a predetermined region of the central portion of the captured image 111 may be used without using the entire image region of the captured image 111.

For example, in step S33 in FIG. 8, the damage image selection unit 240 calculates the projected area of the damaged portion in a predetermined region in the central portion of the captured image 111. This makes it possible to select the captured image 111 in which the damaged portion is sharply imaged as a damage image.

In the example of FIG. 16, a damaged portion represented by the polylines F11-F12, F12-F13, F13-F14, and F14-F15 is imaged in the captured image 111d. A region 111d1 is set in the central portion of the captured image 111d. Although the feature points F12 to F14 are included in the region 111d1, the feature points F11 and F15 are not included in the region 111d1. In this case, the damage image selection unit 240 determines that since the polylines F11 to F12 and F14 to F15 are not imaged in the captured images 111d, the entire damaged portion is not imaged in the captured images 111d. As illustrated in FIG. 9, the damage image selection unit 240 then selects a plurality of captured images 111 as damage images so as to cover the entire damaged portion.

In the same way, the non-damage image selection unit 250 calculates a cover range by a predetermined region 111d1 of the central portion of the captured image 111 in calculating a cover range by the captured image 111 with respect to the 3D model of the structure 60. This makes it possible to select the captured image 111 in which the structure 60 is sharply imaged as a non-damage image.

As a processing method using only a predetermined region in the central portion of the captured image 111 in the above-described manner, for example, only a predetermined region in the central portion of the captured image 111 may be trimmed to reduce the captured image 111 when the image input unit 120 stores the captured image 111 in the storage unit 110.

Figure 17:
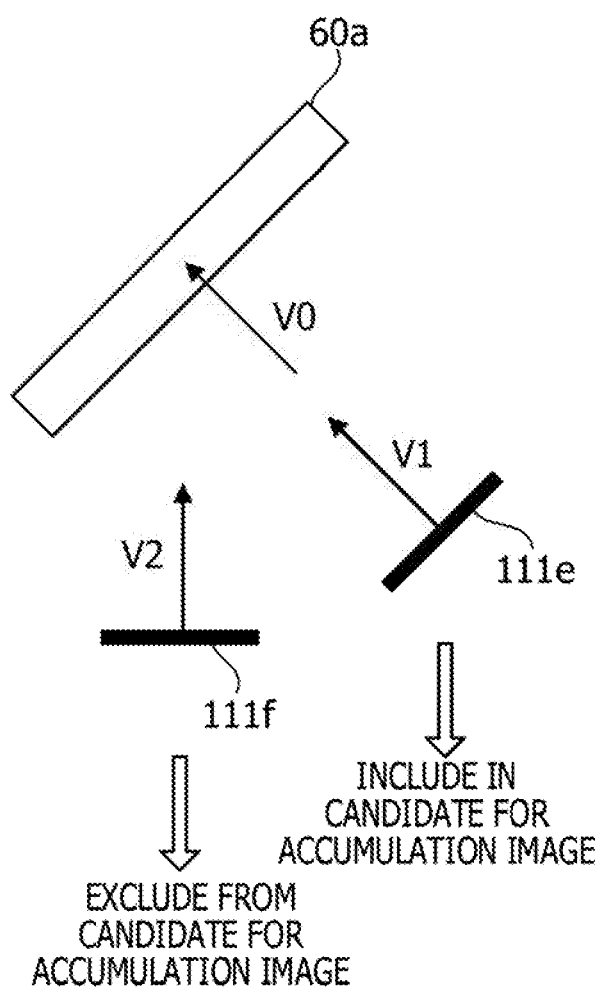
FIG. 17 is a diagram for explaining a second modification.

FIG. 17 is a diagram for explaining a second modification. In an image captured by a camera, as the inclination of the camera direction with respect to the normal to the imaging target surface is larger, it is more difficult to confirm the imaging target with the captured image. In view of this, the accumulation server 200 may be configured not to select a captured image in which the inclination of the camera direction with respect to the normal of the 3D model of the structure 60 is equal to or more than a predetermined value as a damage image or a non-damage image.

For example, in step S32 in FIG. 8, the damage image selection unit 240 specifies a captured image 111 in which a damaged portion is imaged. At this time, the damage image selection unit 240 excludes a captured image 111 in which the inclination of the camera direction with respect to the normal of the 3D model is equal to or more than a predetermined value from among the specified captured images 111. As a result, the captured image 111 having a large inclination of the camera direction is not selected as a damage image. As a result, the captured image 111 in which the damaged portion is easily confirmed is selected as a damage image.

The non-damage image selection unit 250 excludes a captured image 111 in which the inclination of the camera direction relative to the normal of the 3D model is equal to or more than a predetermined value from the processes illustrated in FIGS. 12 and 15. Alternatively, in step S44 in FIG. 12, the non-damage image selection unit 250 may select a captured image 111 in which the evaluation value is maximum and the inclination of the camera direction with respect to the normal of the 3D model is less than a predetermined angle as a non-damage image. In either case, a captured image 111 having a large inclination of the camera direction is not selected as a non-damage image. As a result, a captured image 111 in which a state of the structure 60 is easily confirmed is selected as a non-damage image. It is also possible to improve the calculation accuracy of the coverage ratio in the 3D model.

The inclination of the camera direction may be calculated as follows, for example. The accumulation server 200 calculates the inverse vector of the normal to the surface of the 3D model. It is desirable that the inverse vector is an inverse vector of a normal at a position where the camera optical axis from the center of the captured image passes through the 3D model. The accumulation server 200 calculates an optical axis vector of the captured image. The optical axis vector of the captured image is obtained from the direction (posture) of the camera included in the image management information 112. The accumulation server 200 calculates the inverse vector, the optical axis vector, and the inner product, and when the inner product is equal to or smaller than a predetermined threshold, the accumulation server 200 determines that the inclination is too large, and excludes the captured image from the candidates for an accumulated image (a damage image or a non-damage image).

In the example of FIG. 17, the inverse vector V0 of the normal of the 3D model 60*a*, the optical axis vector V1 of the captured image 111*e*, and the optical axis vector V2 of the captured image 111*f* are obtained. The inner product of the inverse vector V0 and the optical axis vector V1 and the inner product of the inverse vector V0 and the optical axis vector V2 are calculated. If the former calculation result is larger than the threshold and the latter calculation result is equal to or smaller than the threshold, the captured image 111*e* is included in the candidate for an accumulated image, and the captured image 111*f* is excluded from the candidate for an accumulated image.

A part of the processing in the second embodiment may be modified as follows.

As a damage image or non-damage image, a captured image 111 determined to have a high image quality may be selected based on an image quality evaluation value as described below. As the image quality evaluation value, for example, a contrast evaluation value, a luminance gradient evaluation value, and a white overflow/black saturation evaluation value may be used. The contrast evaluation value is calculated by calculating an absolute value of a difference between a pixel value and an intermediate value of pixel values in all pixels, for all pixels in the captured image 111, and summing these absolute values. The luminance gradient is calculated by calculating an absolute value of a difference between a pixel value and a pixel value of a surrounding pixel of the pixel as a luminance gradient of the pixel for all pixels in the captured image 111, and summing these absolute values. The white overflow/black saturation evaluation value is calculated by calculating the ratio of the number of pixels having pixel values between a predetermined upper limit threshold and a predetermined lower limit threshold to the total number of pixels from a luminance histogram for a pixel in the captured image 111.

These image quality evaluation values may be used, for example, as follows. In step S34 in FIG. 8, the damage image selection unit 240 selects a predetermined number of captured images 111 in the descending order of projected area. The damage image selection unit 240 selects an image having the highest image quality evaluation value from among the selected captured images 111 as a damage image. In step S44 in FIG. 12, the non-damage image selection unit 250 selects a predetermined number of captured images 111 in the descending order of evaluation value. The non-damage image selection unit 250 selects an image having the highest image quality evaluation value from among the selected captured images 111 as a non-damage image. In step S55 in FIG. 15, when a plurality of combinations of the captured images 111 satisfying the conditions are extracted, the non-damage image selection unit 250 calculates the image quality evaluation values of the captured images 111 included in the respective combinations. For example, the non-damage image selection unit 250 selects the combination having the highest average value of the image quality evaluation values or the combination having the highest minimum value of the image quality evaluation values, and selects the captured image 111 included in the combination as the non-damage image.

The processing functions of the apparatuses (for example, the information processing apparatus 10, the inspection server 100, and the accumulation server 200) illustrated in each of the above embodiments may be implemented by a computer. In this case, a program in which processing contents of functions to be provided to each apparatus are described is provided and the program is executed by the computer, so that the above-described processing functions are realized on the computer. The program in which the processing contents are described may be preliminarily recorded in a computer readable recording medium. Examples of the computer readable recording medium include a magnetic storage device, an optical disk, a magnetooptical recording medium, and a semiconductor memory. Examples of the magnetic storage device include a hard disk drive (HDD) and a magnetic tape. Examples of the optical disc include a compact disc (CD), a digital versatile disc (DVD), and a Blu-ray Disc (BD, registered trademark). Examples of the magnetooptical recording medium include a magneto-optical disk (MO).

When a program is distributed, portable recording media such as DVDs and CDs in which the program is recorded are sold, for example. Further, the program may be preliminarily stored in a storage device of a server computer and the program may be transferred from the server computer to other computers via a network.

A computer executing a program stores the program recorded in a portable recording medium or the program transferred from the server computer, for example, in a storage device thereof. The computer reads the program from the storage device thereof and executes processing following the program. Here, the computer may directly read the program from the portable recording medium and execute processing following the program. Whenever a program is transferred from the server computer coupled to the computer via the network, the computer may execute processing following the received program in sequence.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a memory; and
a processor coupled to the memory and configured to:
store data of a plurality of images captured of a structure at positions changed relative to the structure and data of a three-dimensional model indicating a three-dimensional shape of the structure;
select an image containing the largest image of a damaged portion in the structure as a first accumulated image from images in each of which the damaged portion is imaged among the plurality of images; and
perform a selection process which includes:
setting a combination of a plurality of polygons which represent the structure of the three-dimensional model by using the data of the three-dimensional model,
identifying, for the plurality of images except the first accumulated image, a coverage ratio of a first area which indicates the plurality of polygons included in a imaging range of accumulated images to a second area which indicates a total area of the plurality of polygons related to the structure of the three-dimensional model, selecting, from among the plurality of images except the first accumulated image, two or more second accumulated images whose the identified coverage ratio is equal to or more than a predetermined value, and storing the first accumulated image and the two or more second accumulated images in the memory.

2. The information processing apparatus according to claim 1, wherein the selection process includes: when a first image is selected from among the images that are not selected as the first accumulated image and the second accumulated images among the plurality of images, calculating a total area of cover ranges covered by a first imaging range by the images selected as the first accumulated image and the second accumulated images and a second imaging range by the first image in a surface region of the three-dimensional model; calculating a peripheral length of the cover ranges; and determining whether to select the first image as the second accumulated image based on an evaluation value calculated from the total area and the peripheral length.

3. The information processing apparatus according to claim 1, wherein the selection process includes repeatedly performing a process until the coverage ratio of the imaging range in the three-dimensional model with the first accumulated image and the second accumulated images becomes equal to or more than the predetermined value, the process including: when a second image is selected from among the images that are not selected as the first accumulated image or the second accumulated images among the plurality of images, calculating a total area of cover ranges covered by a third imaging range by the images selected as the first accumulated image and the second accumulated images and a fourth imaging range by the second image in the surface region of the three-dimensional model; calculating a peripheral length of the cover ranges; and selecting the second image that makes an evaluation value expressed by a ratio of the total area to the peripheral length largest as the second accumulated image.

4. The information processing apparatus according to claim 1, wherein the selection of the first accumulated image includes: based on shape data indicating a three-dimensional shape of the damaged portion in the three-dimensional model, calculating a projected area in which the damaged portion is projected in each of fourth images in each of which the damaged portion is imaged among the plurality of images; and selecting an image whose projected area is largest among the fourth images as the first accumulated image.

5. The information processing apparatus according to claim 1, wherein the selection of the first accumulated image includes: when there is no image in which the entire damaged portion is imaged among the plurality of images, specifying fifth images in each of which the damaged portion is partially imaged from among the plurality of images; and selecting a plurality of the first accumulated images from the fifth images such that the entire damaged portion is included in the imaging range.

6. An accumulated image selecting method executed by a computer, the method comprising:

acquiring data of a plurality of images captured of a structure at positions changed relative to the structure and data of a three-dimensional model indicating a three-dimensional shape of the structure;

selecting an image containing the largest image of a damaged portion in the structure as a first accumulated image from images in each of which the damaged portion is imaged among the plurality of images; and performing a selection process which includes:

setting a combination of a plurality of polygons which represent the structure of the three-dimensional model by using the data of the three-dimensional model, identifying, for the plurality of images except the first accumulated image, a coverage ratio of a first area which indicates the plurality of polygons included in a imaging range of accumulated images to a second area which indicates a total area of the plurality of polygons related to the structure of the three-dimensional model, selecting, from among the plurality of images except the first accumulated image, two or more second accumulated images whose the identified coverage ratio is equal to or more than a predetermined value, storing the first accumulated image and the two or more second accumulated images in the memory.

* * * * *